United States Patent [19] Mather et al.

[11] Patent Number: 4,949,805

[45] Date of Patent: Aug. 21, 1990

[54] ELECTRICALLY CONTROLLED AUXILIARY HYDRAULIC SYSTEM FOR A SKID STEER LOADER

[75] Inventors: Joseph M. Mather, Lisbon; Scott B. Jacobson, Kindred; Thomas Q. Haeder, Lisbon, all of N. Dak.

[73] Assignee: Clark Equipment Company, South Bend, Ind.

[21] Appl. No.: 418,805

[22] Filed: Oct. 4, 1989

Related U.S. Application Data

[63] Continuation of Ser. No. 224,643, Jul. 27, 1988, abandoned.

[51] Int. Cl.[5] .............. B60K 26/00

[52] U.S. Cl. .............. 180/333; 180/324; 180/331

[58] Field of Search .............. 180/53.4, 324, 331, 180/332, 333

[56] References Cited

U.S. PATENT DOCUMENTS

| | | | |
|---|---|---|---|
| 2,658,342 | 11/1953 | Banister et al. | 60/52 |
| 2,720,755 | 10/1955 | Gardiner | 60/52 |
| 3,234,957 | 2/1966 | Allen | 137/117 |
| 3,279,637 | 10/1966 | Olson et al. | 214/778 |
| 3,319,817 | 5/1967 | Juhl et al. | 214/778 |
| 3,606,048 | 9/1971 | Long | 214/138 |
| 3,792,744 | 2/1974 | Gray | 180/333 |
| 4,050,596 | 9/1977 | Zeuner et al. | 214/131 |
| 4,074,782 | 2/1978 | Bauer | 180/6.48 |
| 4,117,899 | 10/1978 | Sagaser et al. | 180/6.48 |
| 4,191,270 | 3/1980 | Monteith | 180/53.4 |
| 4,197,705 | 4/1980 | Westveer | 60/445 |
| 4,492,080 | 1/1985 | Yapp et al. | 60/388 |
| 4,495,770 | 1/1985 | Sagaser et al. | 60/486 |
| 4,583,760 | 4/1986 | Halstensgaard et al. | 280/766.1 |
| 4,645,030 | 2/1987 | von Bernuth et al. | 180/333 |
| 4,712,376 | 12/1987 | Hadank et al. | 60/427 |

FOREIGN PATENT DOCUMENTS

| | | |
|---|---|---|
| 1558604 | 7/1976 | United Kingdom . |
| 2186999 | 7/1987 | United Kingdom . |

OTHER PUBLICATIONS

Melroe Company, brochure entitled *Melroe Bobcat Feller Bunchers,* undated.

Melroe Company, brochure entitled *Bobcat Hydraulic Trencher,* undated.

Gresen–Dana, Catalog PC–4000 entitled *Accessory Valves,* undated, 3 sheets.

Sun Hydraulics Corporation, Catalog entitled *Hydraulic Components for Industrial and Mobile Applications,* Dec. 1985, Cover page and p. 1.48.

European Patent Office, *Communication,* Feb. 7, 1990, 3 pages.

*Primary Examiner*—Kenneth R. Rice

*Attorney, Agent, or Firm*—Kinney & Lange

[57] ABSTRACT

An electrically controlled auxiliary hydraulic system for both front and rear mounted attachments on a skid steer loader. An electrically actuated auxiliary control valve is coupled to the front and rear mounted attachments through an electrically actuated diverter valve. An operator can select between control of either the front or rear attachments by actuating a diverter switch located on a steering lever. The auxiliary control valve is then used to control the selected attachment by actuating forward, reverse and forward latch switches on the control handles. The selected attachment can also be operated in a high pressure mode by actuating a high pressure switch when extra horsepower needs to be delivered to the attachment.

26 Claims, 16 Drawing Sheets

ELECTRICALLY CONTROLLED AUXILIARY HYDRAULIC SYSTEM FOR A SKID STEER LOADER

This is a continuation of application Ser. No. 224,643, filed July 27, 1988 (now abandoned).

BACKGROUND OF THE INVENTION

1. Field of the Invention.

The present invention relates generally to auxiliary hydraulic systems for attachments mounted to skid steer loaders. In particular, the present invention is an electrically controlled auxiliary hydraulic system.

2. Description of the Prior Art.

Skid steer loaders are compact, highly maneuverable vehicles which are widely used in a variety of applications. These vehicles typically include a rear mounted engine which drives several hydraulic pumps. A first variable displacement hydraulic pump is fluidly coupled to a first hydraulic motor on the left side of the vehicle, while a second variable displacement hydraulic pump is coupled to a second motor on the right side of the vehicle. Wheels on the left and right sides of the loader are driven by their respective motors through chain and sprocket linkages. An operator seated within an operator compartment controls the motion of the vehicle by actuating a pair of steering levers which are linked to the variable displacement hydraulic pumps. The extent to which each lever is pushed in the forward direction controls the amount of fluid supplied in a first direction to its respective hydraulic motor, and therefore the speed at which the wheels on that side of the vehicle will rotate. Similarly, the extent to which a lever is pulled in the reverse direction will control the speed at which the wheels on that side of the vehicle are rotated in the reverse direction.

Skid steer loaders also typically include a boom assembly formed by a pair of lift arms pivotally mounted to the main frame. Attachments are pivotally mounted to the front of the lift arms by means of an attachment mount. A separate hydraulic system is used to actuate the boom assembly. Hydraulic lift cylinders which drive the lift arms with respect to the main frame and a tilt cylinder which drives the attachment mount with respect to the lift arms are supplied with hydraulic fluid by a constant displacement implement pump. A pair of foot pedals in the front of the operator's compartment are mechanically linked to spool valves and actuated by an operator to control the flow of hydraulic fluid to the lift and tilt cylinders.

Attachments such as an auger, grapple, sweeper, landscape rake, snow blower or backhoe which include their own hydraulic drive motor are sometimes mounted to the boom assembly. An auxiliary hydraulic system is used to control the flow of hydraulic fluid between the implement pump and the hydraulic motor of the front mounted attachment. In one known system the flow of hydraulic fluid to the motor is controlled by an auxiliary spool valve through actuation of one of the steering levers. The lever is normally biased to a central position. Pushing the lever to the left strokes the auxiliary valve in a first direction, thereby causing hydraulic fluid to flow to the front mounted attachment in a first or forward direction. Pushing the steering lever in the opposite direction (i.e. to the right) strokes the auxiliary valve in such a manner as to supply fluid in a second or reverse direction. The lever is mounted to the floor by an over center pivot arrangement so that it can be latched in the rightward direction, thereby permitting continued flow of fluid in the forward direction.

Feller bunchers are compact and maneuverable vehicles commonly used to harvest trees. These vehicles include a front mounted grapple and shear attachment which is powered by a hydraulic motor. An electrically actuated hydraulic valve controls the flow of fluid to the attachment-driving motor. The operator uses switches mounted to the steering levers to handles of actuate the valve. The grapple is driven in a first direction (e.g., closed) as long as a first switch is pressed, and in a second direction (e.g., opened) while a second switch is pressed.

Attachments such as scarifiers or stabilizers which also include hydraulic motors are sometimes mounted to the rear of the loader. These rear mounted attachments are also supplied with hydraulic fluid from the implement pump by an auxiliary hydraulic system.

In one skid steer loader the valves used to control the lift cylinders, tilt cylinders, and front mounted auxiliary are valves in a four-spool series valve block. The fourth spool valve of the block can be coupled to a rear mounted auxiliary by hoses, and actuated by a mechanical linkage through the left steering control lever in a manner similar to that of the front mounted auxiliary. In still other embodiments, a separate spool valve is mounted within the vehicle and coupled to a lever by a mechanical linkage. This spool valve is then used with any rear mounted attachment the loader may be carrying.

Alternatively, a manually actuated diverter valve is sometimes used to route hydraulic fluid from the front mounted attachment to the rear mounted attachment. The spool valve used to control the front mounted attachment can then also be used to control the rear mounted attachment.

When a skid steer loader is equipped with a front or rear mounted attachment in which most of the work is performed by the hydraulic motor of the attachment, overall system performance could be enhanced if a larger percentage of the engine power were available from the hydraulic system. However, since the predominant use of skid steer loaders is with attachments not equipped with hydraulic motors, and many of the attachments that do have motors require less power than is normally available, little or no increase in hydraulic power is generally required. System pressure, which is regulated by relief valves, is therefore kept lower than that which could be accommodated by the system. Operation in this manner helps prolong the life of seals and other system components.

It is evident that there is a continuing need for improved skid steer loader hydraulic systems. A hydraulic system which is capable of accommodating both front and rear mounted attachments is needed. A system capable of controlling the amount of power available to the attachments would also be desirable. The hydraulic system must of course be reliable and convenient to use.

SUMMARY OF THE INVENTION

A skid steer loader in accordance with a first embodiment of the present invention includes an operator compartment, ground-engaging drive wheels, and hydraulic pump means driven by an engine for providing hydraulic fluid under pressure. An attachment having an auxiliary hydraulic motor can be mounted to the loader by attachment mounting means. Auxiliary fluid fitting means couple hydraulic fluid to the hydraulic motor of the attachment. The auxiliary fluid fitting means is coupled to the hydraulic pump means by an electrically actuated hydraulic control valve which controls flow of hydraulic fluid to the auxiliary fluid fitting means in response to electric control signals. Operator actuated auxiliary forward latch switch means mounted within the operator compartment and coupled to the auxiliary control valve causes continuous hydraulic fluid flow in a first direction to the auxiliary fluid fitting means by providing the electric auxiliary control signals in response to operator actuation.

A skid steer loader in accordance with a second embodiment of the present invention includes an operator compartment, an engine, ground engaging drive wheels, and hydraulic pump means driven by the engine for providing hydraulic fluid under pressure. Attachment mounting means for mounting an attachment having a hydraulic motor to the loader are also included. Auxiliary fluid fitting means couple hydraulic fluid to the hydraulic motor of the attachment. A hydraulic control valve couples the auxiliary fluid fitting means to the hydraulic pump means in a hydraulic circuit, and controls hydraulic fluid flow to the auxiliary fluid fitting means. Electrically actuated pressure relief means coupled in the hydraulic circuit and responsive to electric pressure control signals cause the pressure of the hydraulic fluid in the hydraulic circuit to have one of a plurality of maximum pressures. Pressure control switch means mounted within the operator compartment and coupled to the pressure relief means provide the electric pressure control signals in response to operator actuation. The operator can thereby select the maximum pressure of the hydraulic fluid in the hydraulic circuit.

Another embodiment of a skid steer loader in accordance with the present invention also includes an operator compartment, an engine, ground engaging drive wheels, and hydraulic pump means driven by the engine for providing hydraulic fluid under pressure. A lift arm assembly is pivotally mounted to the loader. A front mounted attachment having a hydraulic motor can be mounted to the lift arm assembly by a front attachment mount. Front auxiliary fluid fitting means couple hydraulic fluid to a hydraulic motor of a front mounted attachment. A rear mounted attachment having a hydraulic motor is mounted to a rear portion of the loader by a rear attachment mount. Rear auxiliary fluid fittings couple hydraulic fluid to a hydraulic motor of a rear mounted attachment. An auxiliary control valve is coupled between the hydraulic pump means and the front and rear auxiliary fluid fitting means. An electrically controlled diverter valve is coupled between the auxiliary control valve and the front auxiliary fluid fitting means, and between the auxiliary control valve and the rear auxiliary fluid fitting means. The electrically controlled diverter valve selectively routes fluid between the auxiliary control valve and one of the front and rear auxiliary fluid fitting means in response to electric auxiliary select control signals. A diverter switch coupled to the diverter valve provides the auxiliary select signals in response to operator actuation.

Skid steer loaders in accordance with the present invention can accommodate both front and rear mounted attachments. The amount of power available to the attachments can be controlled. The hydraulic system is reliable, and can be conveniently actuated by an operator from within the operator compartment.

DETAILED DESCRIPTION OF THE PREFERRED EMBODIMENTS

Figure 1:
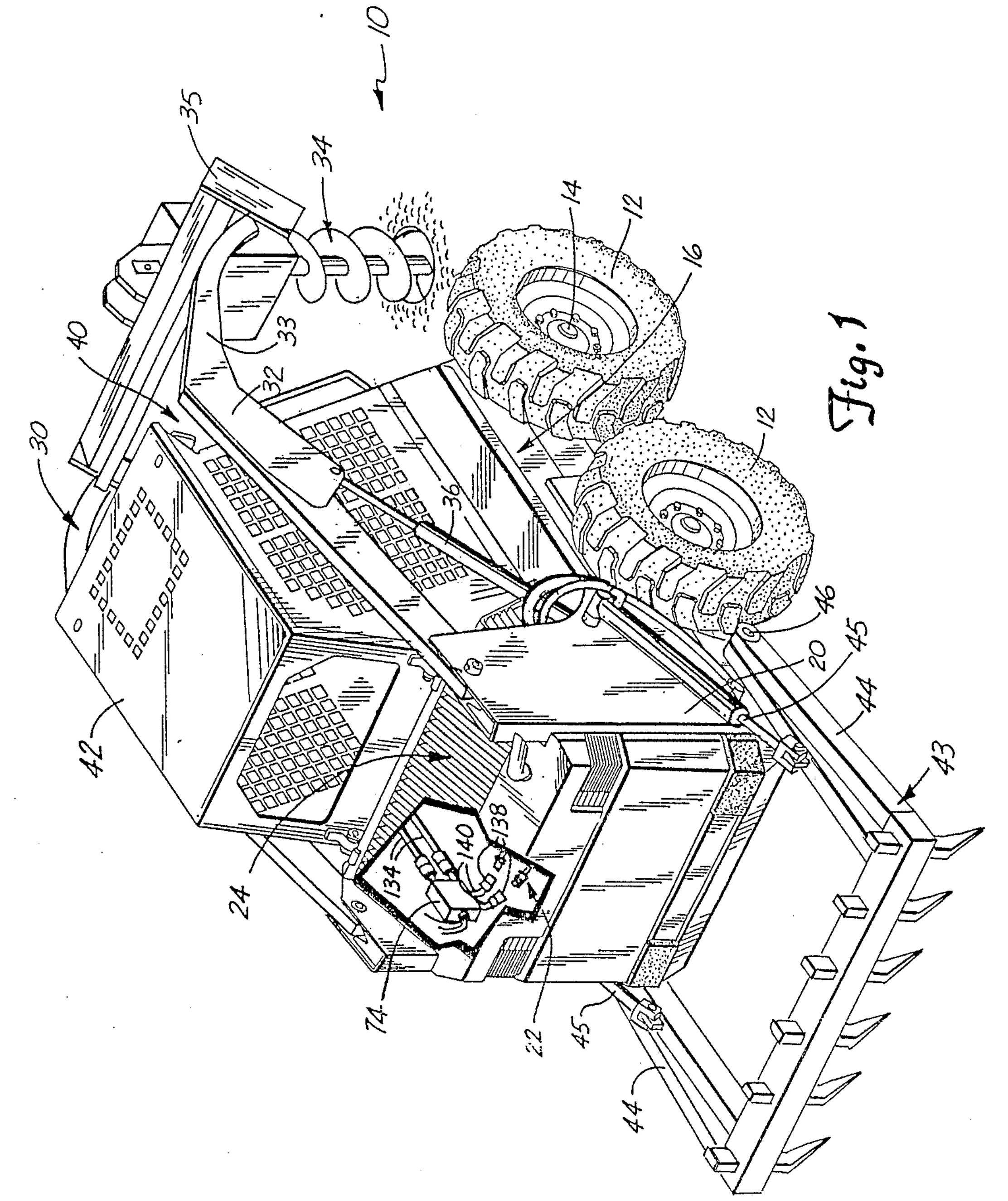
FIG. 1 is a perspective view taken from the right rear side of a skid steer loader which includes an electrically controlled auxiliary hydraulic system in accordance with the present invention.
Figure 2:
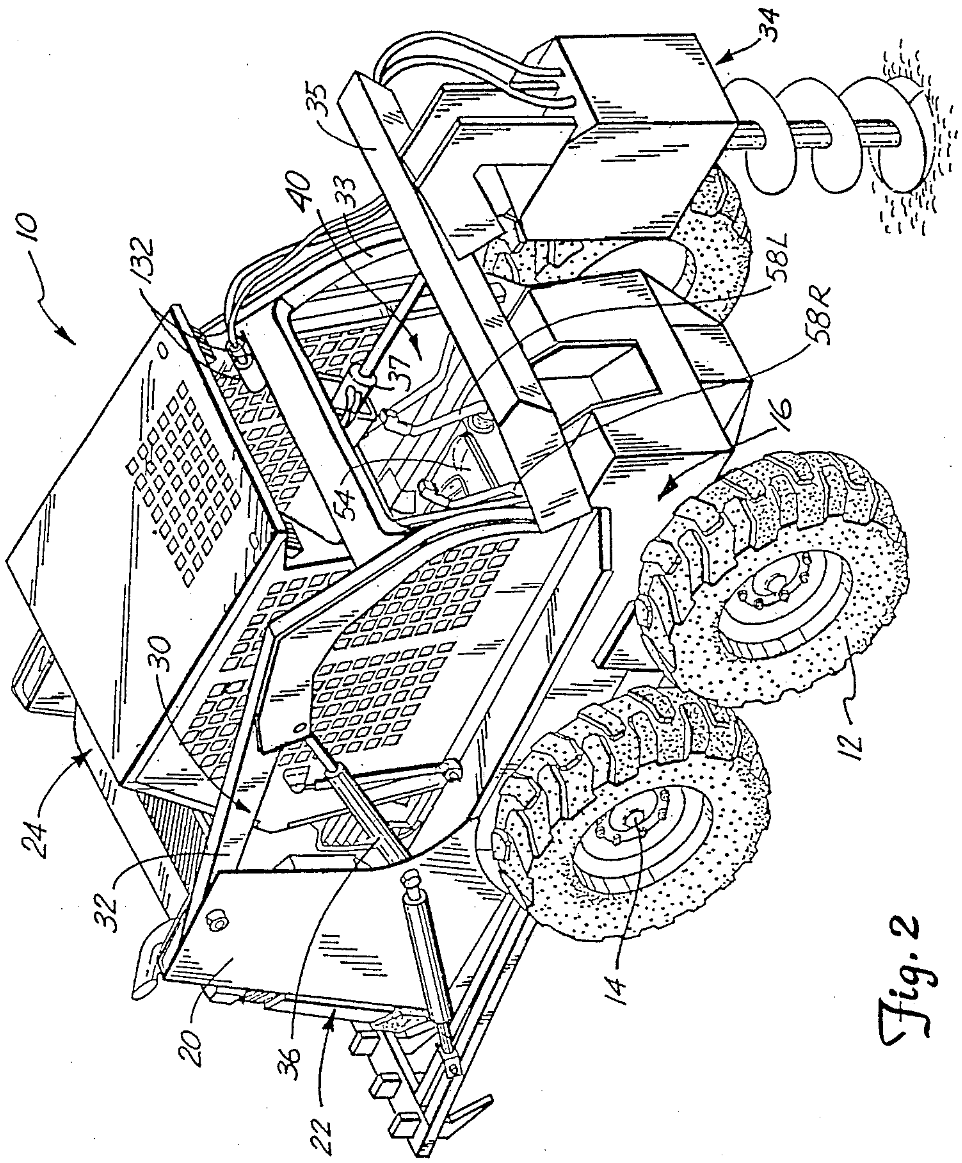
FIG. 2 is an illustration of the loader shown in FIG. 1 taken from the right front side.

A skid steer loader 10 which includes an electrically controlled auxiliary hydraulic system in accordance with the present invention is illustrated generally in FIGS. 1 and 2. Loader 10 includes a main frame assembly 16 mounted to a lower frame assembly or transmission case (not shown), lift arm assembly 30 and operator's compartment 40. An engine compartment 22 and heat exchanger compartment 24 are located at the rear of the vehicle. Wheels 12 are mounted to stub axles 14 and extend from both sides of main frame 16.

Lift arm assembly 30 is mounted to upright members 20 which are located at the rear of main frame assembly 16. As shown, lift arm assembly 30 includes an upper portion formed by a pair of lift arms 32, and a lower portion 33. A front attachment mount 35 is pivotally mounted to lower portion 33. Front mounted attachments such as auger 34 are mounted to lift arm assembly 30 by means of mount 35. Lift arm assembly 30 is raised and lowered with respect to main frame assembly 16 by a pair of lift cylinders 36. Attachment mount 35, and therefore auger 34, are rotated with respect to lift arms 32 by tilt cylinder 37.

Rear mounted attachments such as scarifier 43 can also be carried by loader 10. Rear scarifier 43 includes a pair of rearwardly extending members 44 which are rotatably mounted to upright members 20 by means of rear pivot mounts 46 (only one is visible in FIG. 1). Double-acting rear hydraulic cylinders 45 (i.e., a linear hydraulic motor) raise and lower scarifier 43 with respect to loader 10.

Operator's compartment 40 is partially enclosed by cab 42. Cab 42 is an integral unit which is pivotally mounted at its rear to main frame 16. Cab 42, including the operator seat, can thereby be rotated upwardly and toward the rear of loader 10 to permit access to engine compartment 22, the transmission case, and other mechanical and hydraulic systems described herein.

All operations of loader 10 can be controlled by an operator from within operator compartment 40. The hydraulic drive system of loader 10 includes a pair of steering levers 58L and 58R which are pivotally mounted on the left and right sides, respectively, of seat 54. Levers 58L and 58R can be independently moved in forward and rearward directions, and are biased to a central or neutral position. Actuation of levers 58L and 58R causes wheels 12 on the respective side of loader 10 to rotate at a speed and in a direction corresponding to the extent and direction of lever motion. Lift cylinders 36 and tilt cylinder 37 are independently actuated through movement of separate foot pedals (not visible) mounted toward the front of operator compartment 40. The general operation of skid steer loaders such as 10 is well known.

Figure 3:
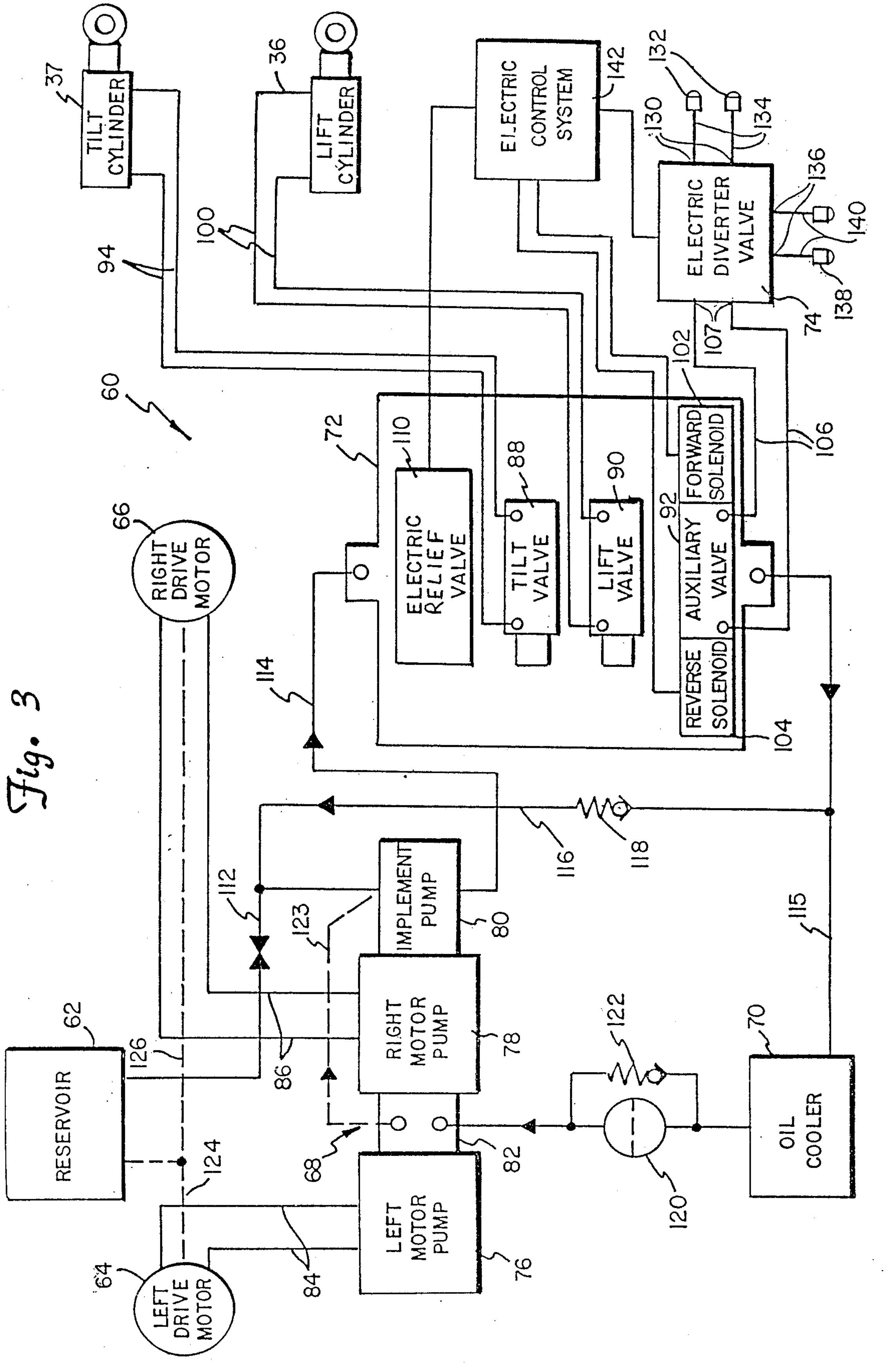
FIG. 3 is a block diagram representation of a first embodiment of an electrically controlled auxiliary hydraulic system and electric control system in accordance with the present invention.

An auxiliary hydraulic system 60 for skid steer loader 10, and its interconnections to electric control system 142, are illustrated diagrammatically in FIG. 3. As shown, hydraulic system 60 includes a fluid reservoir 62, left hydraulic drive motor 64, right hydraulic drive motor 66, hydraulic pump assembly 68, hydraulic fluid or oil cooler 70, three-spool series valve block 72 and electric diverter valve 74. Pump assembly 68 includes reversible, variable displacement motor pumps 76 and 78, constant displacement implement pump 80, and internal charge relief valve 82. Pumps 76, 78 and 80 are all mounted within engine compartment 22 (FIG. 1) and driven by the engine (not shown).

Left motor pump 76 is coupled to left drive motor 64 by hydraulic hoses 84, while right motor pump 78 is coupled to right drive motor 66 through hydraulic hoses 86. Drive motor 64 is mounted to the left side of the transmission case and is coupled to wheels 12 on the left side of loader 10 by a sprocket and chain linkage (not shown). Similarly, right drive motor 66 is mounted to the right side of the transmission case, and is coupled to wheels 12 on the right side of loader 10 by a sprocket and chain linkage (not shown). Levers 58L and 58R are individually coupled by linkages (not shown) to left motor pump 76 and right motor pump 78, respectively. The direction and extent to which levers 58L and 58R are moved controls the direction and volume of hydraulic fluid provided to drive motors 64 and 66, respectively, and therefore the direction and speed at which loader 10 is driven.

Valve block 72 includes a tilt valve 88, lift valve 90, and auxiliary valve 92. Valves 88, 90 and 92 are interconnected in a series hydraulic circuit. Tilt valve 88 and lift valve 90 are manually actuated spool valves coupled by linkages (not shown) to the foot pedals in the front of operator compartment 40. Tilt valve 88 is coupled to tilt cylinder 37 by hydraulic hoses 94, while lift valve 90 is coupled to lift cylinders 36 by hydraulic hoses 100.

Auxiliary valve 92 is an electrically actuated spool valve mechanically coupled to forward actuation solenoid 102 and reverse actuation solenoid 104. As shown, the fluid outlet ports of auxiliary valve 92 are coupled to inlet ports 107 of diverter valve 74 through hydraulic hoses 106. Solenoids 102 and 104 are connected to receive electric auxiliary select signals from electric control system 142. When actuated, forward solenoid 102 drives the spool (not separately shown) of auxiliary valve 92 in a first direction, causing hydraulic fluid to flow to diverter valve 74 in a first or forward direction through hoses 106. When reverse solenoid 104 is actuated, the spool is driven in a second direction, and causes hydraulic fluid flow to diverter valve 74 in a second or reverse direction.

Electrically controlled relief valve 110 is connected in a hydraulic circuit with the series arrangement of tilt valve 88, lift valve 90 and auxiliary valve 92. Relief valve 110 is also coupled to electric control system 142. In response to electric pressure control signals provided by electric control system 142, relief valve 110 selectably controls the relief pressure of hydraulic system 60. Whenever the pressure within system 60 exceeds the relief setting of valve 110, the valve will shunt fluid to reservoir 62.

Figure 12:
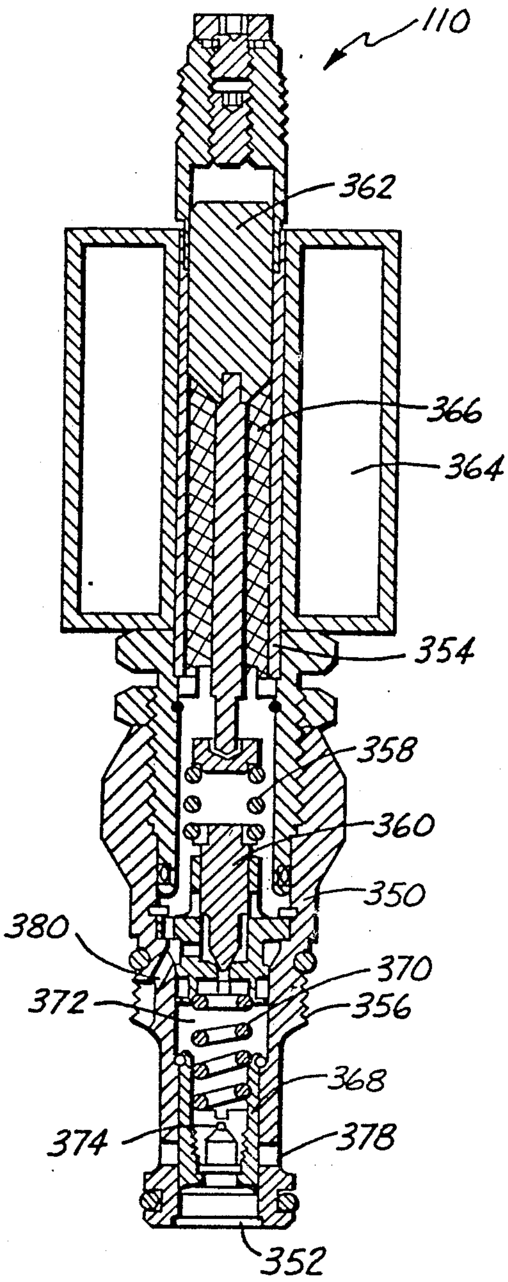
FIG. 12 is a detailed sectional view of the electrically actuated series relief valve shown in FIG. 3.
Figure 13:
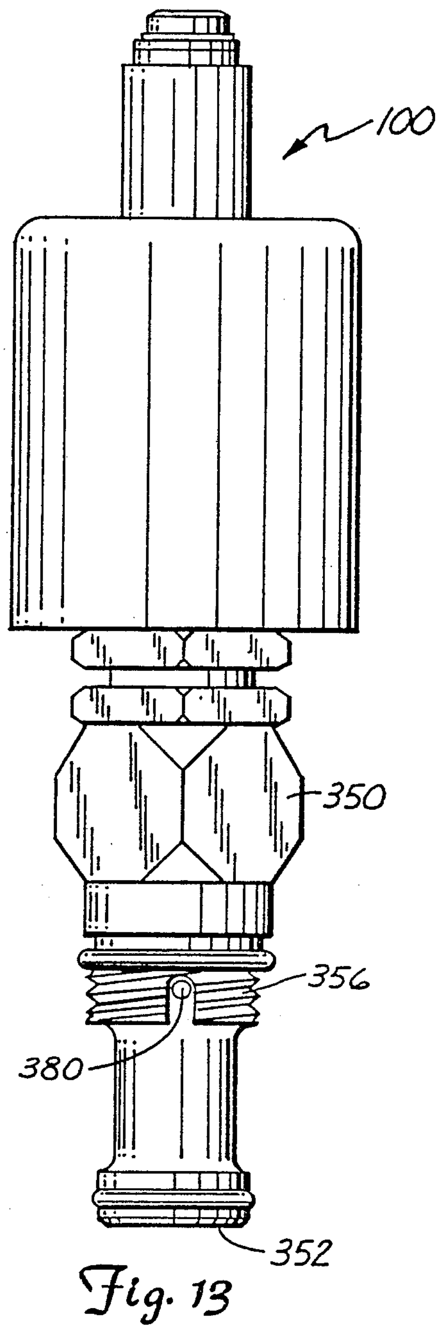
FIG. 13 is an external view of the electrically actuated series relief valve shown in FIG. 12.

A preferred embodiment of relief valve 110 is illustrated in FIGS. 12 and 13. Relief valve 110 includes a body 350 having a system pressure opening 352 on one end thereof, and a stem tube 354 extending from the opposite end. Threads 356 on body 350 permit relief valve 110 to be threadably mounted to valve block 72. Relief valve 110 is a pilot operated valve which includes pilot relief spring 358 and pilot relief spool 360. The pressure exerted by pilot relief spring 358 on relief spool 360 can be controlled by armature 362 and solenoid 364. When solenoid 364 is not energized, relief spring 358 will apply a first relatively low force against pilot relief spool 360, (i.e. a first relief valve setting). Solenoid 364 is energized through the application of electric pressure control signals from electric control system 142. When energized, solenoid 364 actuates armature 362 and forces the armature into engagement against armature stop 366 as shown in FIG. 12. Armature 362 thereby compresses pilot relief spring 358, causing the relief spring to exert a second and greater force on pilot spool 360 (i.e., a second relief valve setting).

Main relief spool 368 and main relief spring 370 are positioned within chamber 372. Hydraulic fluid from valve block 72 enters chamber 372 through system pressure opening 352 and orifice 374. At system pressures lower than the pressure of the pilot relief valve setting, main relief spool 368 is pressure balanced, and main relief spring 370 keeps the main relief spool in its closed position. Relief outlet ports 378 are therefore sealed when system pressure is less than the pilot relief valve setting.

As system pressure rises, the pressure in chamber 372 also rises. When the pressure reaches the relief setting of the force acting on pilot relief spool 360 by pilot relief spring 358, spool 360 will open. Hydraulic fluid is thereby released from chamber 372 through passage 380. The resulting pressure differential causes the pressure within system 60 to force main relief spool 368 into chamber 372. Hydraulic fluid can thereby escape through ports 378, preventing any further rise in the pressure of the fluid within valve block 72.

Referring back to FIG. 3, implement pump 80 is coupled to reservoir 62 by hydraulic hose 112. Pressurized hydraulic fluid from an outlet of implement pump 80 is supplied to an inlet port of valve block 72 through hose 114. An outlet port of valve block 72 is coupled to oil cooler 70 through hose 115, and to reservoir 62 (via hose 112) through hose 116 and excess oil bypass relief valve 118. After being cooled by oil cooler 70, hydraulic fluid from valve block 72 is coupled to an inlet port of pump assembly 68 through a parallel combination of filter 120 and relief valve 122. An internal case drain (represented by broken line 123) couples a port of relief valve 82 to the inlet port of implement pump 80. Case drains from hydraulic motors 64 and 66 are also coupled to reservoir 62, through hydraulic hoses 124 and 126, respectively.

As shown in FIG. 1, electrically controlled diverter valve 74 can be mounted within engine compartment 22, on left upright member 20. Front auxiliary ports 130 of diverter valve 74 are coupled to front mounted attachment hydraulic fittings 132 by hydraulic hoses 134. As shown in FIG. 2, front mounted attachment fittings 132 can be mounted to lower portion 33 of lift arm assembly 30, near attachment mount 35. The hydraulic motor of front mounted attachments such as auger 34 can then be conveniently connected to hydraulic system 60. Rear auxiliary ports 136 of diverter valve 74 are coupled to rear mounted attachment hydraulic fittings 138 through hydraulic hoses 140. In the embodiment shown in FIG. 1, rear mounted attachment hydraulic fittings 138 are mounted within engine compartment 22 near diverter valve 74. Hydraulic cylinders 45 of rear scarifier 43 can then be easily interconnected to hydraulic system 60.

Electric diverter valves such as 74 are well known and commercially available from a number of manufacturers. In response to electric auxiliary select signals from electric control system 142, diverter valve 74 will selectively route hydraulic fluid received through its input ports 107 to either output ports 130 or output ports 136. Auxiliary valve 92 can then be used to control either the front mounted attachment, such as auger 34, or the rear mounted attachment, such as rear scarifier 43.

Figure 4:
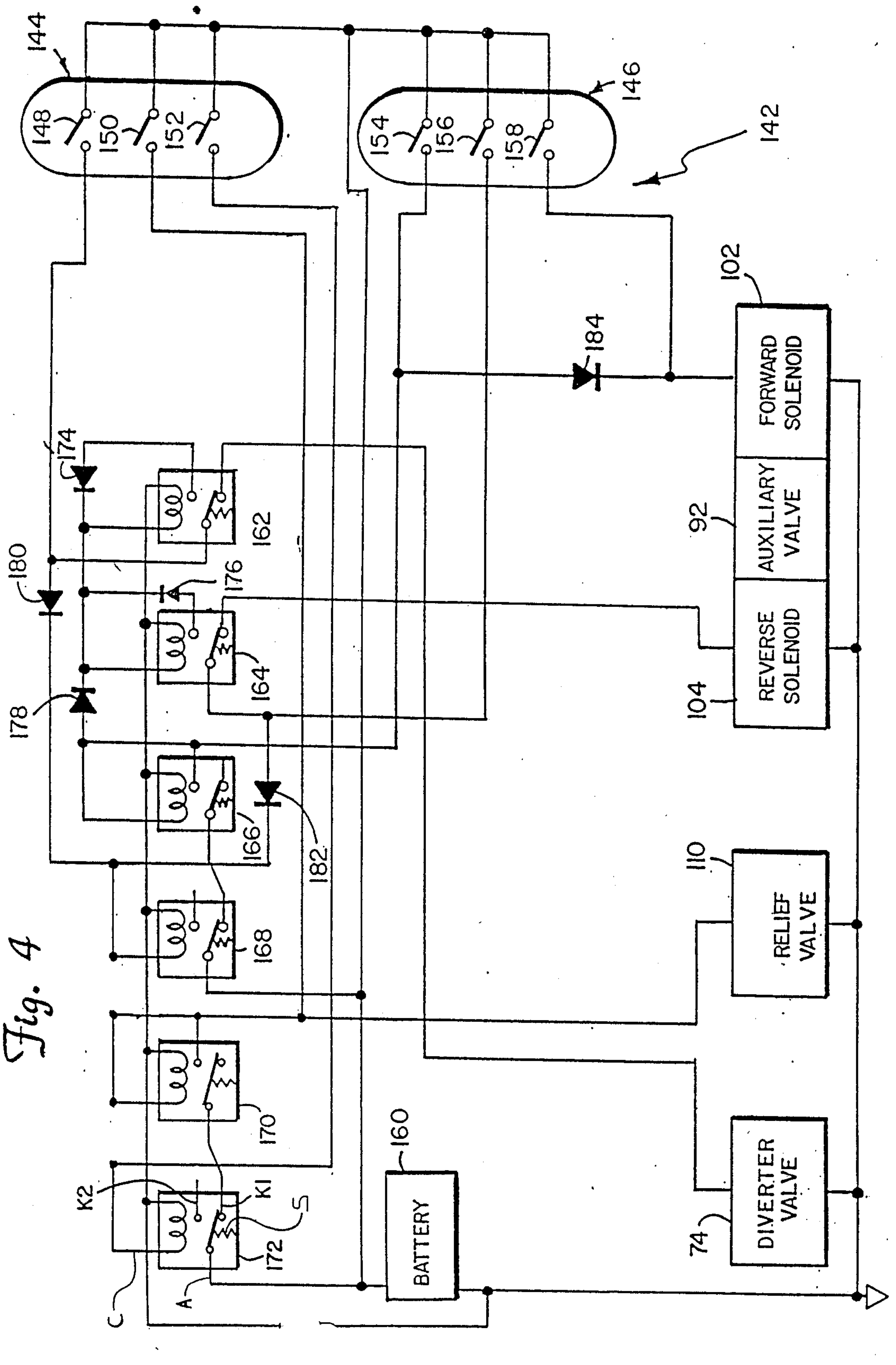
FIG. 4 is a schematic and block diagram representation of the electric control system shown in FIG. 3.

Electric control system 142 and its interconnections to auxiliary valve solenoids 102 and 104, relief valve 110 and diverter valve 74 of hydraulic system 60 are illustrated in FIG. 4. An operator interfaces with electric control system 142 through switch assemblies 144 and 146. Switch assemblies 144 and 146 are positioned on the top of the hand grips of steering levers 58L and 58R, respectively, for convenience of use. Switch assembly 144 includes a diverter valve switch 148, high pressure latch switch 150, and high pressure unlatch switch 152. Switch assembly 146 includes auxiliary latch switch 154, auxiliary forward switch 158, and auxiliary reverse switch 156. Switches 148, 150, 152, 154, 156 and 158 are biased by a spring or other means (not shown) to a normally open position.

Figure 5A:
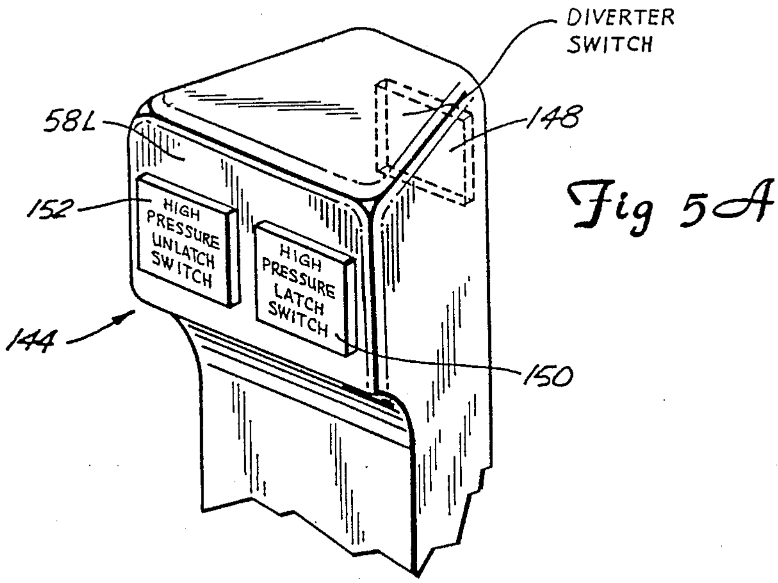
FIG. 5A is a detailed view of the top of the hand grip on the left steering lever shown in FIG. 2.
Figure 5B:
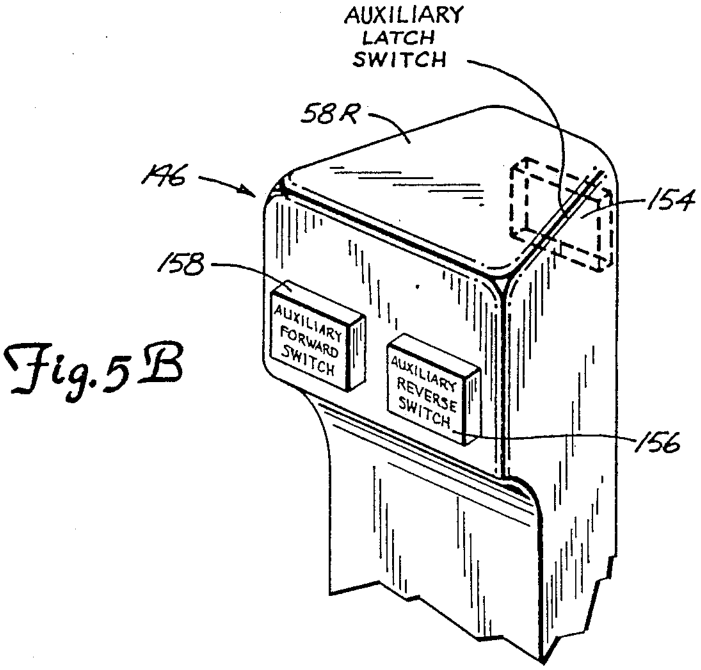
FIG. 5B is a detailed view of the top of the hand grip on the right steering lever shown in FIG. 2.

In the preferred embodiment illustrated in FIG. 5A, high pressure latch switch 150 and unlatch switch 152 are positioned on the rearward side of hand grip of lever 58L, with switch 150 on the right side and switch 152 on the left side. Diverter switch 148 is mounted on the forward side of lever 58L. Auxiliary reverse switch 156 and auxiliary forward switch 158 are positioned on the right and left sides, respectively, of the rearward side of the hand grip of lever 58R. Auxiliary latch switch 154 is mounted to the forward side of the hand grip on lever 58R.

Referring back to FIG. 4, electric control system 142 is shown to also include battery 160, electromechanical relays 162, 164, 166, 168, 170 and 172, and diodes 174, 176, 178, 180, 182 and 184. Relays 162-172 each include a coil C having a pair of terminals, armature A, contacts K1 and K2, and spring S. Armature A is normally biased into electrical contact with contact K1 by spring S. When coil C is energized by the application of power to its terminals, armature A is forced into electrical contact with contact K2 against the bias force of spring S.

A first or positive terminal of battery 160 is connected to armature A of relays 172 and 168, and to a first terminal of switches 148, 150, 152, 154, 156 and 158. A negative terminal of battery 160 is connected to the first terminal of coil C of relays 162-172, and to a first terminal of diverter valve 74, relief valve 110, forward solenoid 102 and reverse solenoid 104. Contact K1 of relay 172 is connected to armature A of relay 170. Contact K2 of relay 170 is connected to the second terminal of coil C of relay 170, to the second terminal of high pressure latch switch 150, and to the second terminal of series relief valve 110. Contact K1 of relay 168 is connected to armature A of relay 166. Contact K2 of relay 166 is connected to a second terminal of forward solenoid 102 and a second terminal of auxiliary forward switch 158 through diode 184, and to second terminals of coils C of relays 162 and 164 through diode 178. Contact K2 of relay 166 is also connected to a second terminal of coil C of relay 166, and to a second terminal of auxiliary latch switch 154.

Contact K2 of relay 164 is connected to the second terminal of coils C of relays 162 and 164 through diode 176. Contact K1 of relay 164 is connected to a second terminal of reverse solenoid 104. Relay 162 has its contact K2 connected to the second input terminal of coil C of relay 162 through diode 174. Contact K1 of relay 162 is coupled to a second input terminal of diverter valve 74.

A second terminal of diverter switch 148 is coupled to armature A of relay 162, and to a second terminal of coil A of relay 168 through diode 180. A second terminal of high pressure latch switch 150 is coupled to the second terminal of series relief valve 110. A second terminal of high pressure unlatch switch 152 is connected to the second terminal of coil C of relay 172. A second terminal of auxiliary reverse switch 156 is connected to armature A of relay 164, and to a second terminal of coil C of relay 168 through diode 182.

Electric control system 142 functions in the following manner. Diverter switch 148 is actuated by an operator to select between control of the front mounted attachment (e.g. auger 34), and the rear mounted attachment (e.g. scarifier 43). When diverter switch 148 is unactuated, no current will flow through contact K1 of relay 162 to diverter valve 74. Diverter valve 74 therefore remains in its normal or unactuated state, with auxiliary valve 92 being coupled to fittings 132 through hoses 106 and 134 (FIG. 3).

Having selected auger 34 in this manner, the operator can cause the auger to be driven in a first or forward direction by actuating auxiliary forward switch 158 with their thumb. When actuated, switch 158 will allow current to flow to forward solenoid 102. The spool of auxiliary valve 92 will therefore be stroked in a first direction, resulting in forward fluid flow to auger 34. This fluid flow will stop when auxiliary forward switch 158 is released.

Auxiliary reverse switch 156 is actuated by the operator to cause fluid flow in the reverse direction to auger 34. When switch 156 is closed, current will flow through relay 164 to reverse solenoid 104, causing the spool of auxiliary valve 92 to be stroked in the second direction. Hydraulic fluid flow in the second direction will stop when switch 156 is released.

Auxiliary latch switch 154 is actuated when continuous operation of auger 34 is desired. When closed, switch 154 causes current from battery 160 to be applied to coil C of relay 166. Armature A of relay 166 is thereby brought into contact with contact K2 of the relay, resulting in a continuous current flow to coil C of the relay and to forward solenoid 102 through relay 168. Even though auxiliary latch switch 154 is released and opened, relay 166 is "latched".

When it is desired to stop the continuous forward operation of auger 34, the operator will actuate auxiliary reverse switch 156. This action results in a current flow which causes coil C of relay 168 to pull its armature A to its contact K2, thereby discontinuing the flow of current to armature A and coil C of relay 166. Current flow to forward solenoid 102 is therefore discontinued.

When the operator desires to actuate the rear mounted accessory (e.g., raise or lower scarifier 43), diverter switch 148 is actuated and switched to its closed position. Current from battery 160 will then flow to diverter valve 74 through armature A and contact K1 of relay 162. Solenoids (not separately shown) within diverter valve 74 are thereby actuated, causing hydraulic fluid from auxiliary valve 92 to be routed to fittings 138 through hoses 106 and 140 (FIG. 3). The actuation of diverter switch 148 also energizes coil C of relay 168, thereby discontinuing the flow of current to forward solenoid 102 through relay 166 in the event relay 166 was still latched from an earlier actuation of auxiliary latch switch 154.

With diverter switch 148 switched to its closed position, auxiliary latch switch 154, auxiliary reverse switch 156 and auxiliary forward switch 158 can be actuated by an operator in the manner described above to control the direction and continuity of fluid flow provided by auxiliary valve 92 to rear scarifier 43. Diverter switch 148 will be again actuated and switched to its open position when it is desired to use switches 154, 156 and 158 to control auger 34.

If the operator desires to operate either auger 34 or scarifier 43 in any manner described above and at higher horsepower levels, high pressure latch switch 150 can be actuated. This action will cause current to flow through coil C of relay 170, pulling armature A of the relay into contact with its contact K2. Current will then flow through relays 172 and 170 to coil C of relay 170. Relay 170 is thereby "latched" and provides a continuous flow of current to relief valve 110. In response, solenoid 364 of relief valve 110 (FIG. 12) will cause the valve to provide relief at the second higher pressure, increasing the pressure at which fluid can be supplied to the front and rear mounted attachments. Diverter switch 148 and auxiliary switches 154, 156 and 158 can then be actuated in the manner described above to control the flow of hydraulic fluid to the front and rear mounted attachments.

In one embodiment relief valve 110 is configured to operate at a first or low pressure relief setting of twenty-three hundred psi, and at a second or high pressure relief pressure of three thousand three hundred psi. Although components of hydraulic system 60 are designed to operate at maximum pressures at least as great as the high pressure relief setting, most attachments do not need to be operated at this setting. Using the lower relief setting in normal operation is therefore adequate for most purposes, and helps reduce wear on hydraulic system 60 (e.g. seals) since it is not operated at its maximum specified rating. However, by giving the operator the capability of using the higher pressure setting, more horsepower can be delivered to the attachment when it is needed.

When it is desired to return hydraulic system 60 to its normal or lower pressure mode, high pressure unlatch switch 152 is actuated. Actuation of switch 152 causes current to flow through coil C of relay 172, pulling armature A into contact K2 of the relay, and discontinuing the flow of current to coil C of relay 170. Relay 170 is then "unlatched", discontinuing the flow of current to relief valve 110. Relief valve 110 will then operate at its normal or lower relief pressure.

Figure 6:
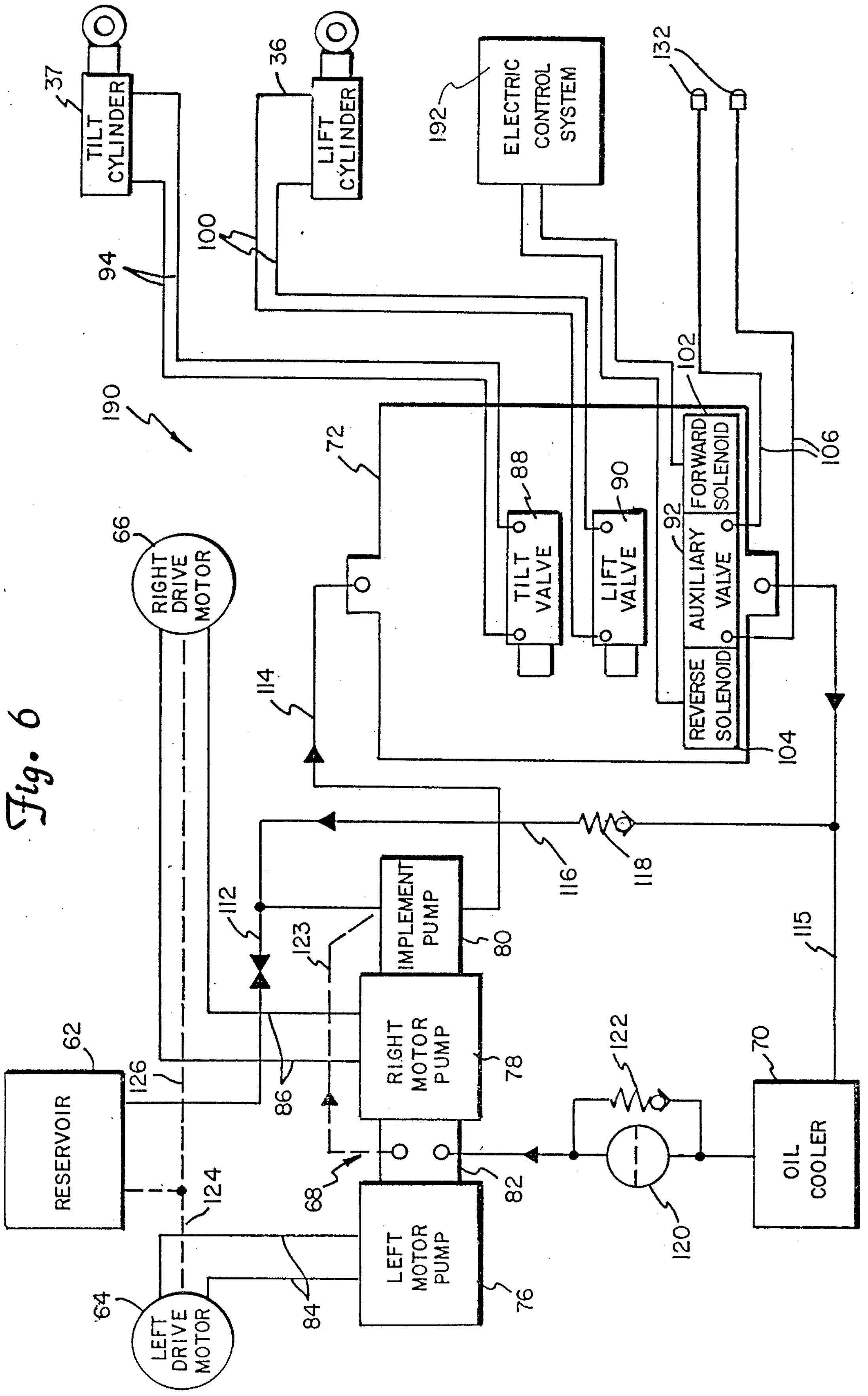
FIG. 6 is a block diagram representation of an electrically controlled auxiliary hydraulic system and electric control system in accordance with the second embodiment of the present invention.
Figure 7:
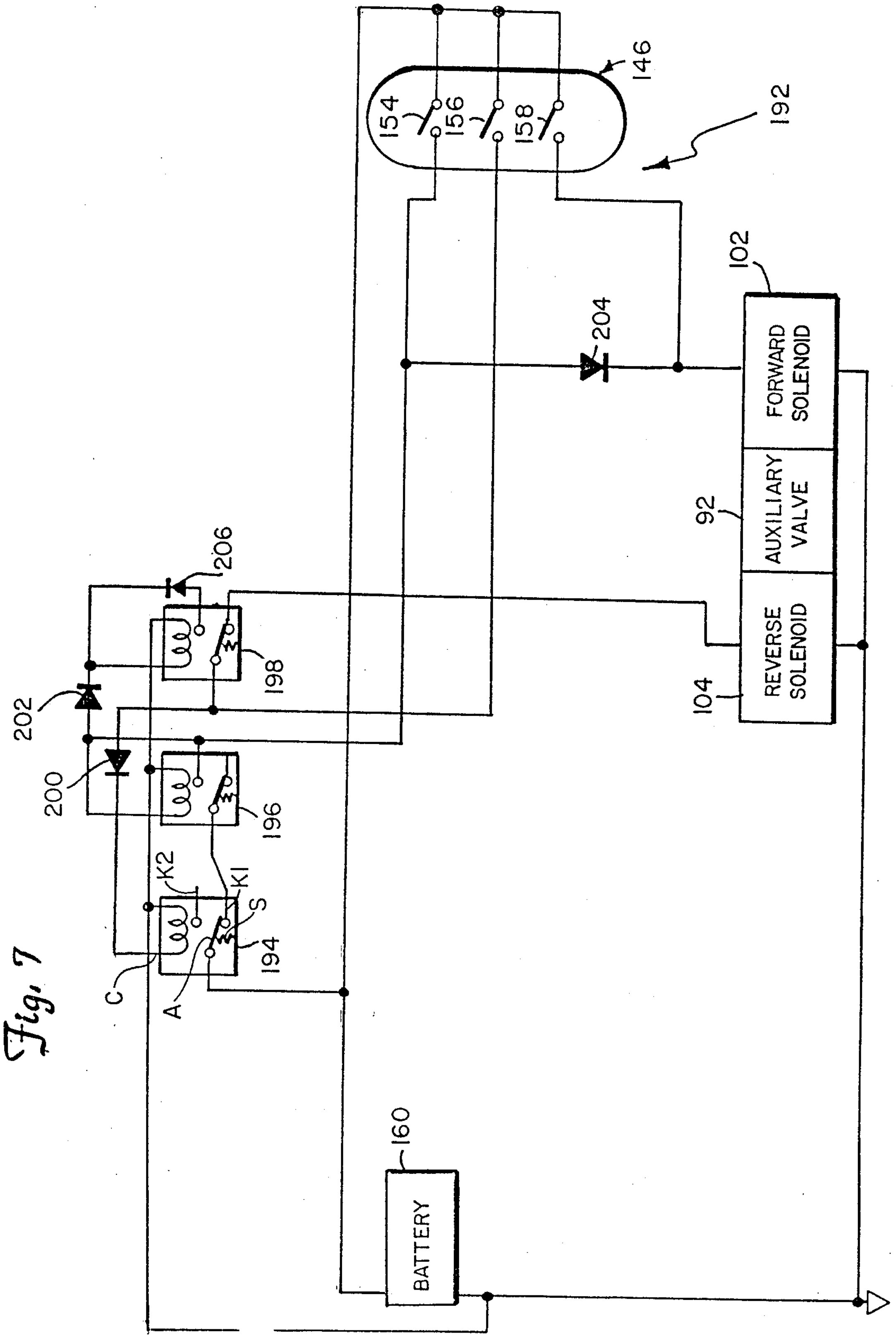
FIG. 7 is a schematic and block diagram representation of the electric control system shown in FIG. 6.

Skid steer loader 10 can also be built with subsets of the options included within hydraulic system 60. A first variation, hydraulic system 190 and its associated electric control system 192, is illustrated in FIGS. 6 and 7, respectively. Hydraulic system 190 is similar to that of hydraulic system 60 described above with reference to FIG. 3, but does not include electric series relief valve 110 or diverter valve 74. Elements shown in FIGS. 6 and 7 which can function in a manner similar to their counterparts in FIGS. 3 and 4 are denoted by identical reference numerals. As shown in FIG. 6, electric control system 192 is coupled to only reverse solenoid 104 and forward solenoid 102. The output ports of auxiliary valve 92 are coupled directly to fittings 132 through hoses 106.

As shown in FIG. 7, electric control system 192 includes switch assembly 146, forward solenoid 102, reverse solenoid 104 and battery 160. Also included are relays 194, 196 and 198, and diodes 200, 202, 204 and 206. Control circuit 192 is configured in such a manner that actuation of auxiliary latch switch 154, auxiliary reverse switch 156, and auxiliary forward switch 158 will control solenoids 102 and 104 of auxiliary valve 92 in a manner identical to that of control system 142 described above with reference to FIG. 4.

Figure 8:
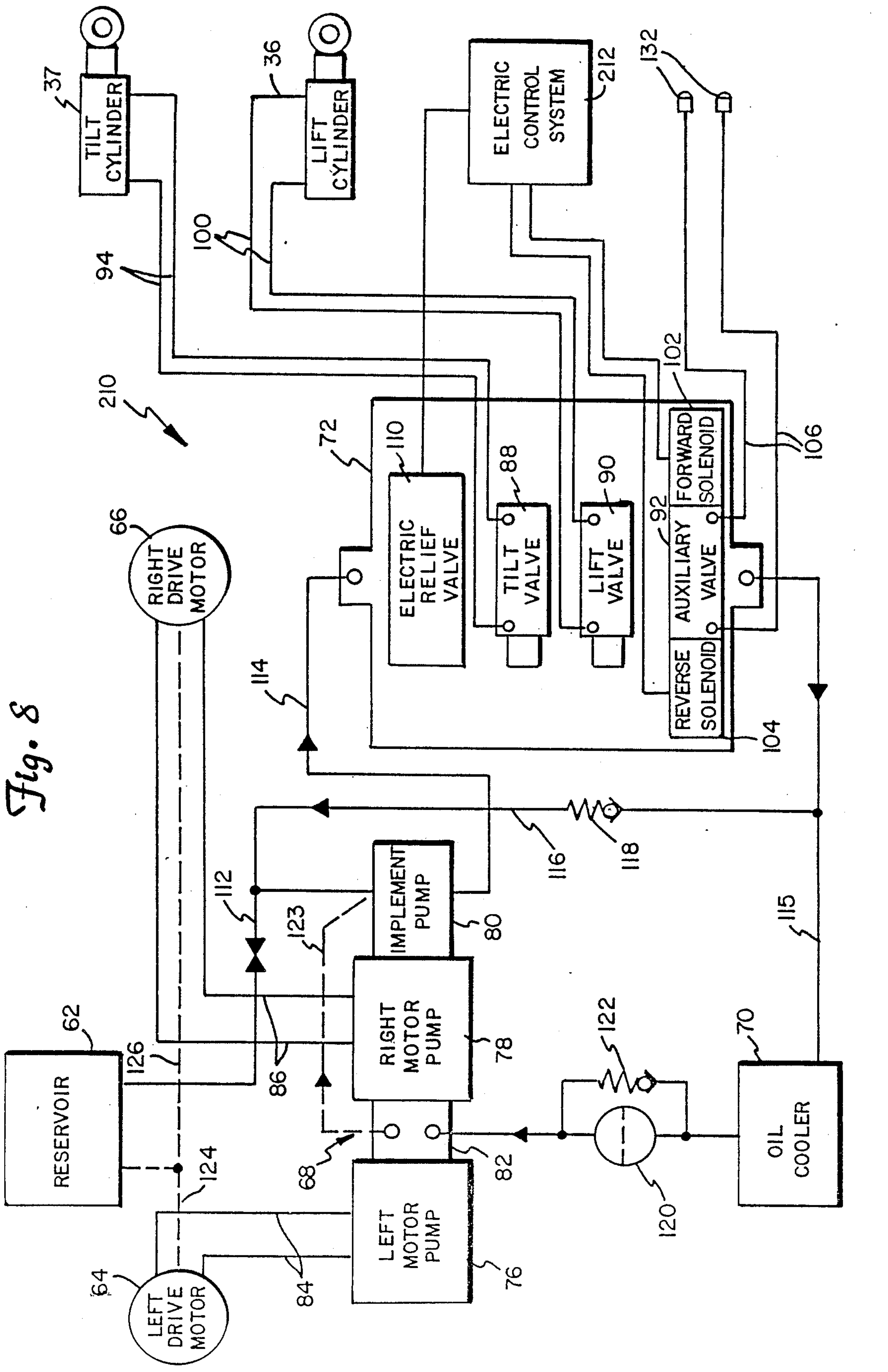
FIG. 8 is a block diagram representation of an electrically controlled auxiliary hydraulic system and associated electric control system in accordance with a third embodiment of the present invention.
Figure 9:
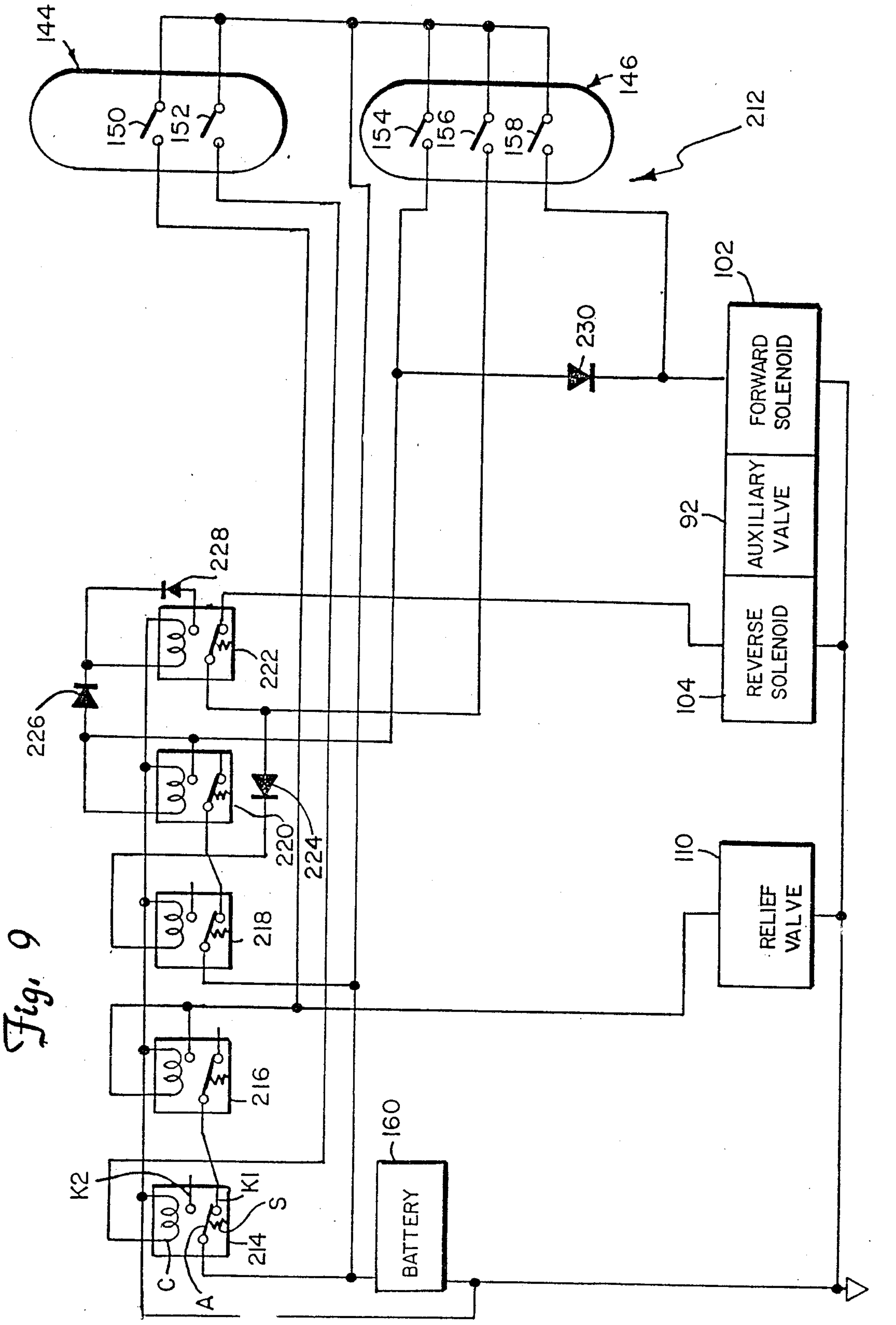
FIG. 9 is a schematic and block diagram representation of the electric control system shown in FIG. 8.

A second variation, hydraulic system 210 and its associated electric control system 212, are illustrated in FIGS. 8 and 9, respectively. Hydraulic system 210 is similar to that of hydraulic system 60 described above with reference to FIG. 3, but does not include electric diverter valve 74. Electric control system 212 is interfaced only to forward solenoid 102, reverse solenoid 104 and electric relief valve 110. Elements shown in FIGS. 8 and 9 which can function in a manner similar to their counterparts in FIGS. 3 and 4 are denoted by identical reference numerals.

Electric control system 212 includes switch assemblies 144 and 146, forward solenoid 102, reverse solenoid 104, relief valve 110 and battery 160. Also included are relays 214, 216, 218, 220 and 222, and diodes 224, 226, 228 and 230. Control system 212 is configured in such a manner that the actuation of switches 150 and 152 of switch assembly 144 and switches 154, 156 and 158 of switch assembly 146 causes relief valve 110 and solenoids 102 and 104 to function in the manner described above with reference to electric control system 142.

Figure 10:
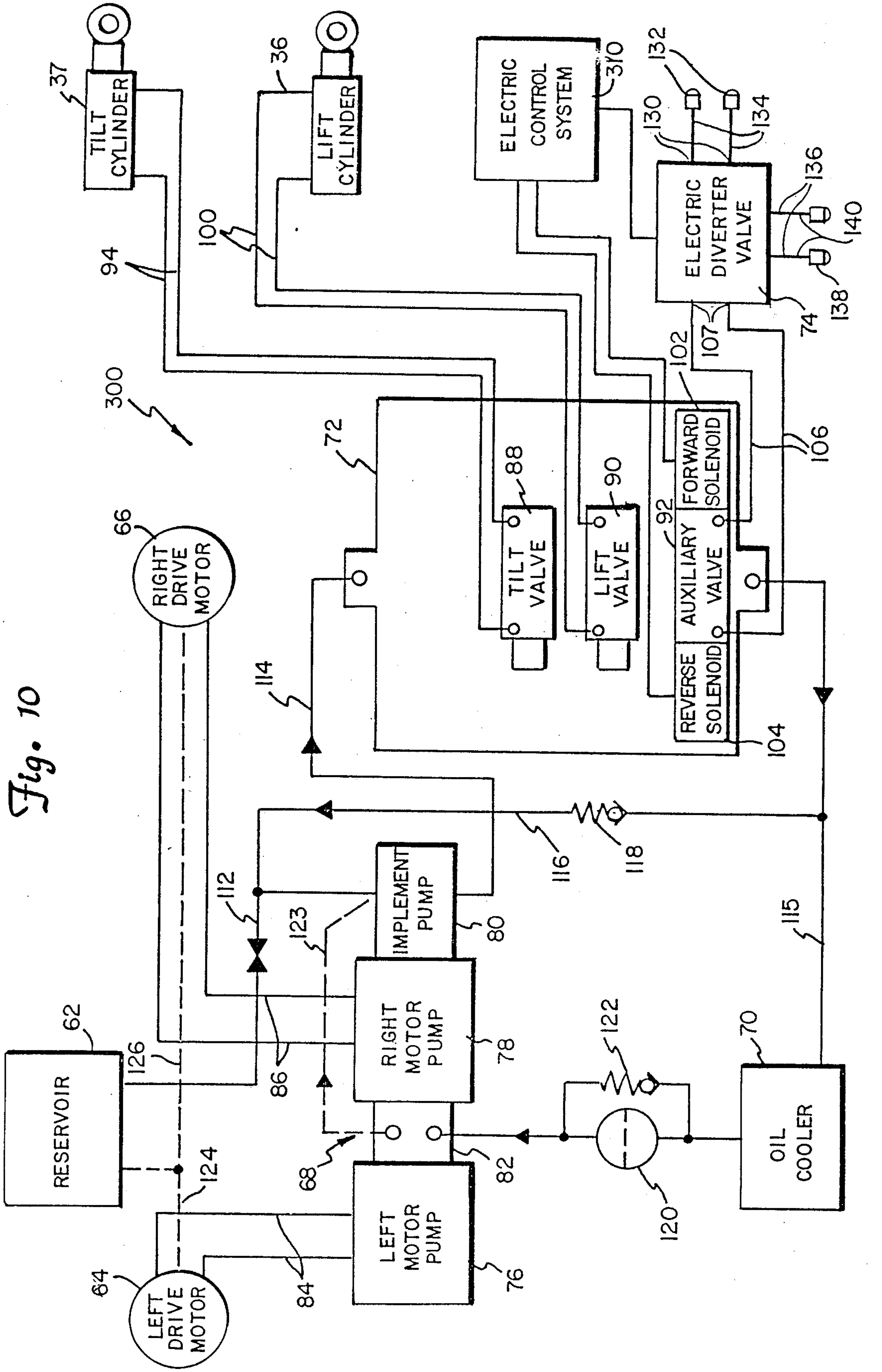
FIG. 10 is a block diagram representation of an electrically controlled auxiliary hydraulic system and its associated electric control system in accordance with a fourth embodiment of the present invention.
Figure 11:
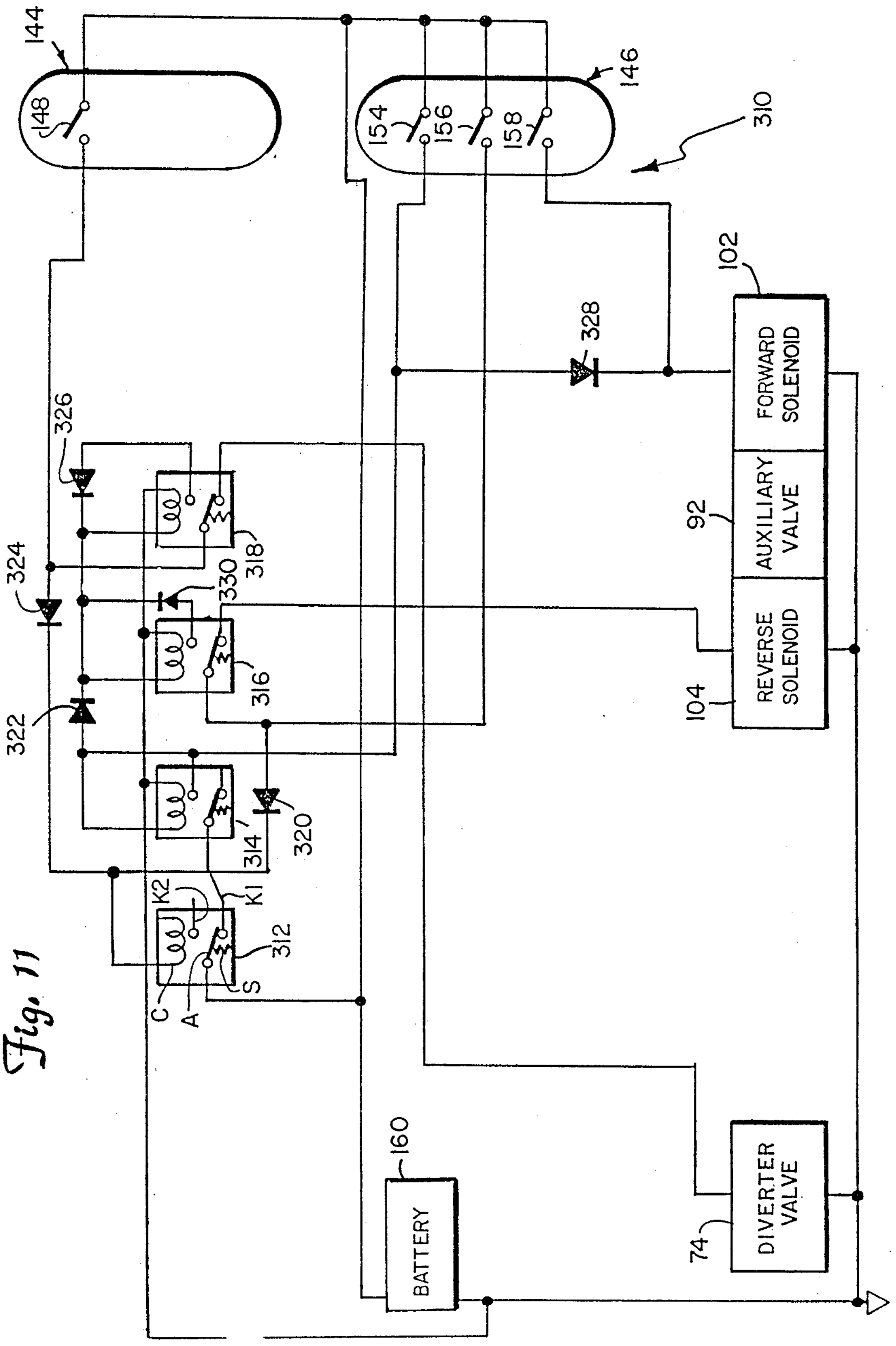
FIG. 11 is a schematic and block diagram representation of the electric control system shown in FIG. 10.

A third variation or option, hydraulic system 300 and its associated electric control system 310, is illustrated in FIGS. 10 and 11, respectively. Hydraulic system 300 is similar to hydraulic system 60, with the exception that electrical relief valve 110 and its associated high pressure option functions are not included. Elements shown in FIGS. 10 and 11 which function in a manner similar to their counterparts in FIGS. 3 and 4 are denoted by identical reference numerals.

Electric control system 310 includes switch assemblies 144 and 146, solenoids 102 and 104, diverter valve 74, battery 160, relays 312, 314, 316 and 318, and diodes 320, 322, 324, 326, 328 and 330. Electric control system 310 is configured in such a manner that actuation of switches 148, 154, 156 and 158 will cause diverter valve 74 and solenoids 102 and 104 to operate in a manner described above with reference to electric control system 142.

Figure 14:
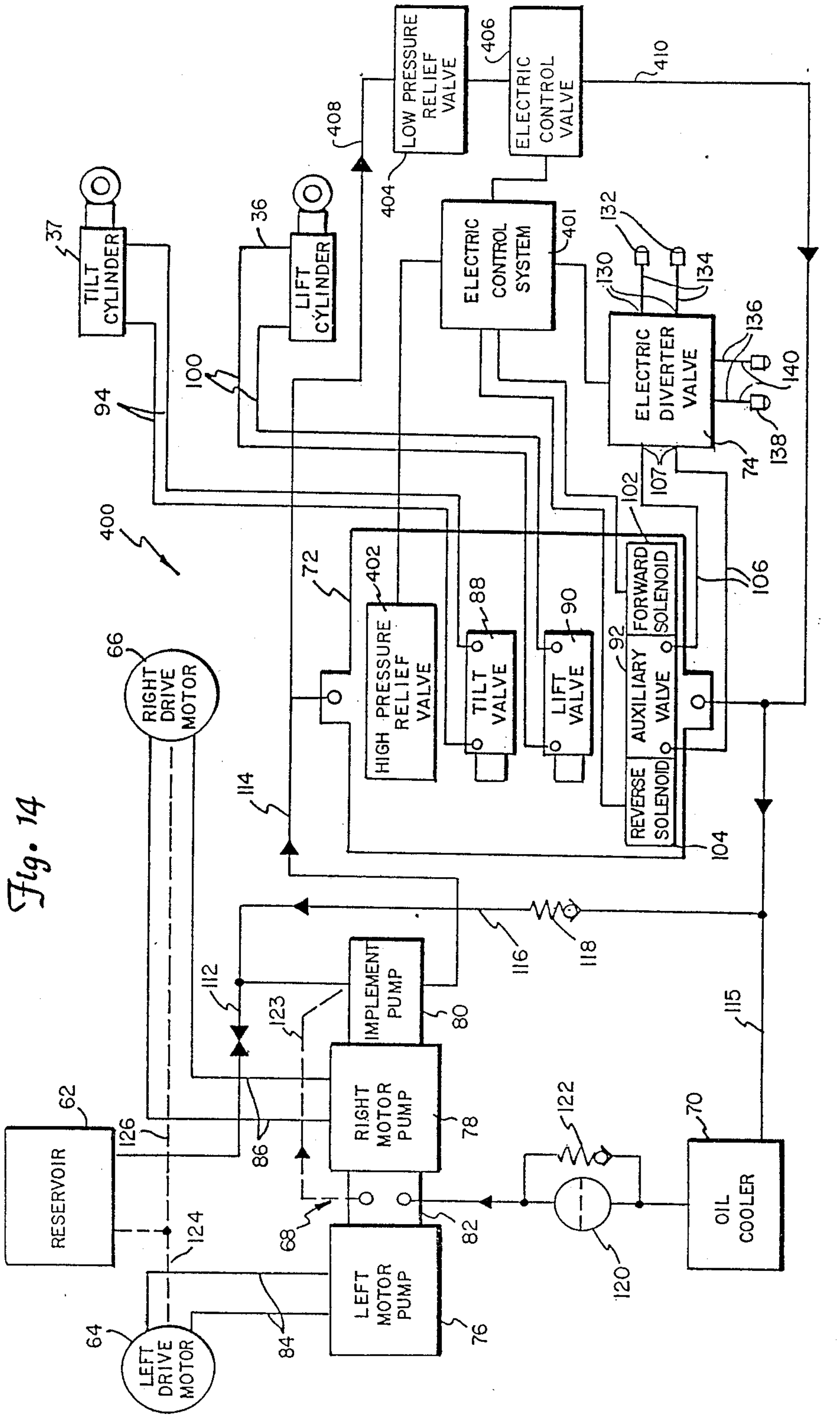
FIG. 14 is a block diagram representation of an electrically controlled auxiliary hydraulic control system and associated electric control system in accordance with the fifth embodiment of the present invention.
Figure 15:
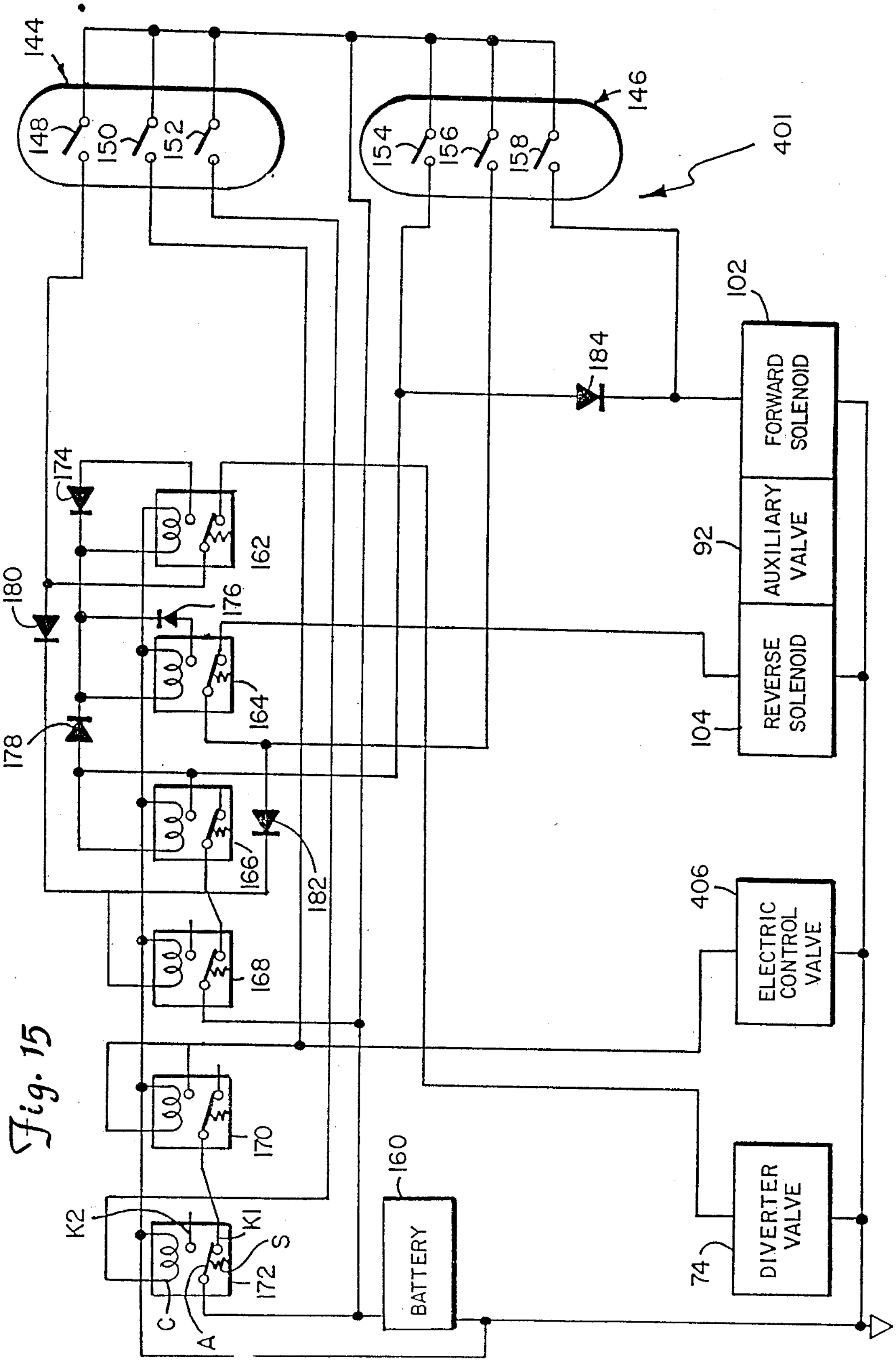
FIG. 15 is a schematic and block diagram representation of the electric control system shown in FIG. 14.

Another embodiment of the present invention, hydraulic system 400 and its associated electric control system 401, is illustrated in FIGS. 14 and 15, respectively. Hydraulic system 400 includes all of the options described above with reference to hydraulic system 60, but has the high pressure option implemented in a different manner. As shown, hydraulic system 400 includes high pressure relief valve 402, low pressure relief valve 404 and electric control valve 406. Elements shown in FIGS. 14 and 15 which function in a manner similar to their counterparts in FIGS. 3 and 4 are denoted by identical reference numerals.

In the embodiment shown, high pressure relief valve 402 is mounted within valve block 72. Low pressure relief valve 404 and electric control valve 406 are interconnected in a series arrangement. The series arrangement of values 404 and 406 is coupled in parallel with the series arrangement of valves 88, 90 and 92 by means of hydraulic hoses 408 and 410. Electric control system 401 is electrically coupled to electric control valve 406.

As shown in FIG. 15, electric control system 401 is identical to that of latch control system 142, with the exception that relief valve 110 has been replaced with electric control valve 406. When high pressure switch 150 is unactuated or in its open state, no current flows to electric control valve 406, thereby enabling hydraulic fluid to flow through low pressure relief valve 404 and electric control valve 406. Should the system pressure exceed the low relief pressure setting (e.g. twenty-three hundred psi) of low pressure relief valve 404, the low pressure relief valve will shunt the excess fluid to reservoir 62, thereby maintaining system pressure at the low pressure relief setting. When an operator wishes to operate hydraulic control system 400 in its high pressure mode, high pressure latch switch 150 will be actuated and cause electric control valve 406 to be driven to its closed position. With electric control valve 406 in its closed position, hydraulic fluid is unable to flow through low pressure relief valve 404. The pressure relief setting of hydraulic system 400 is therefore governed by the relief setting of high pressure relief valve 402 (e.g. three thousand three hundred psi). Should system pressure exceed that of high pressure relief valve 402, excess fluid will be shunted to reservoir 62. High pressure unlatch switch 152 will be actuated by an operator to discontinue the flow of current to electric control valve 406 and return system 400 to its normal relief setting.

Figure 16:
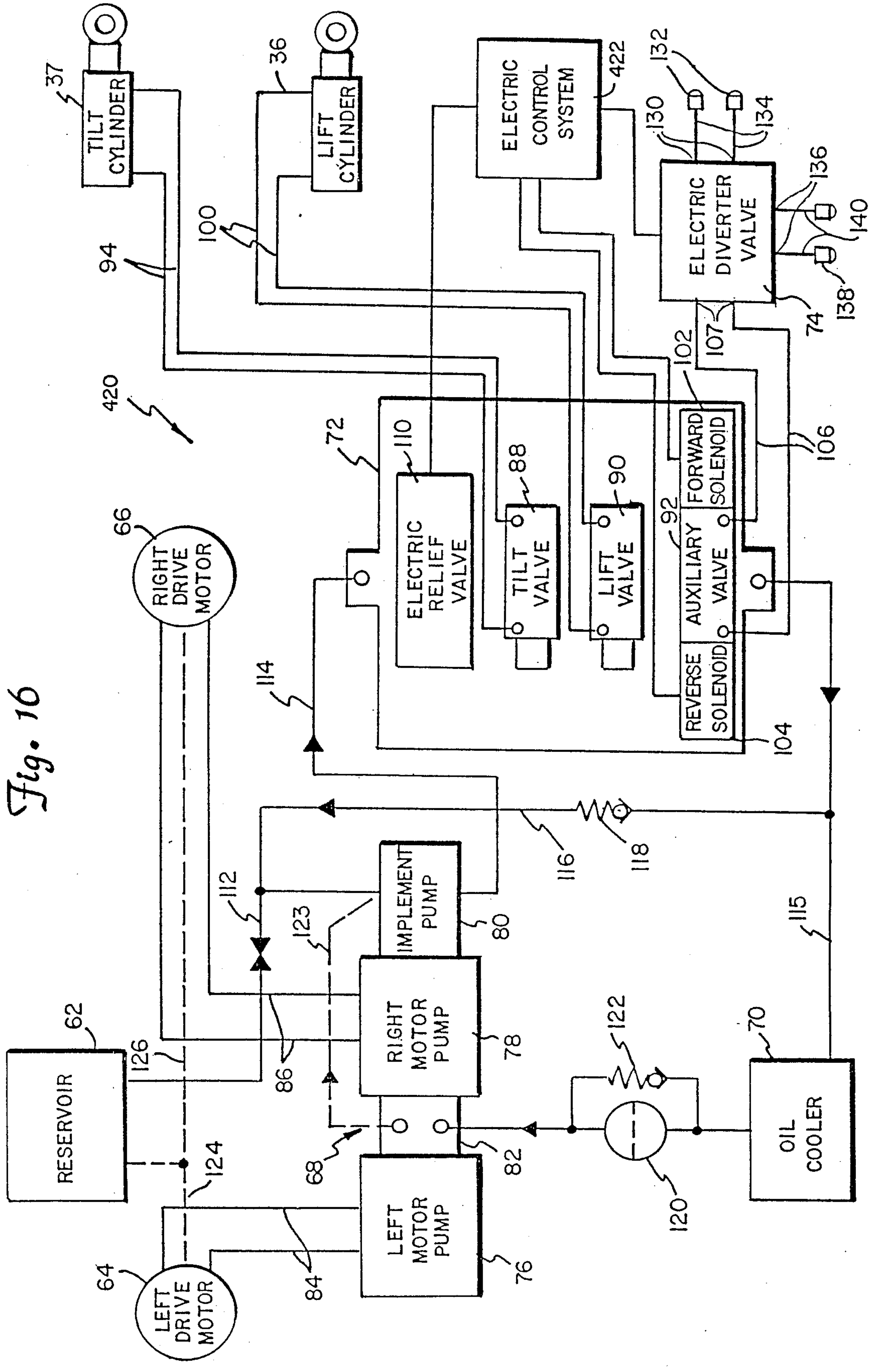
FIG. 16 is a block diagram representation of an electrically controlled auxiliary hydraulic system and associated electric control system in accordance with a sixth embodiment of the present invention.
Figure 17:
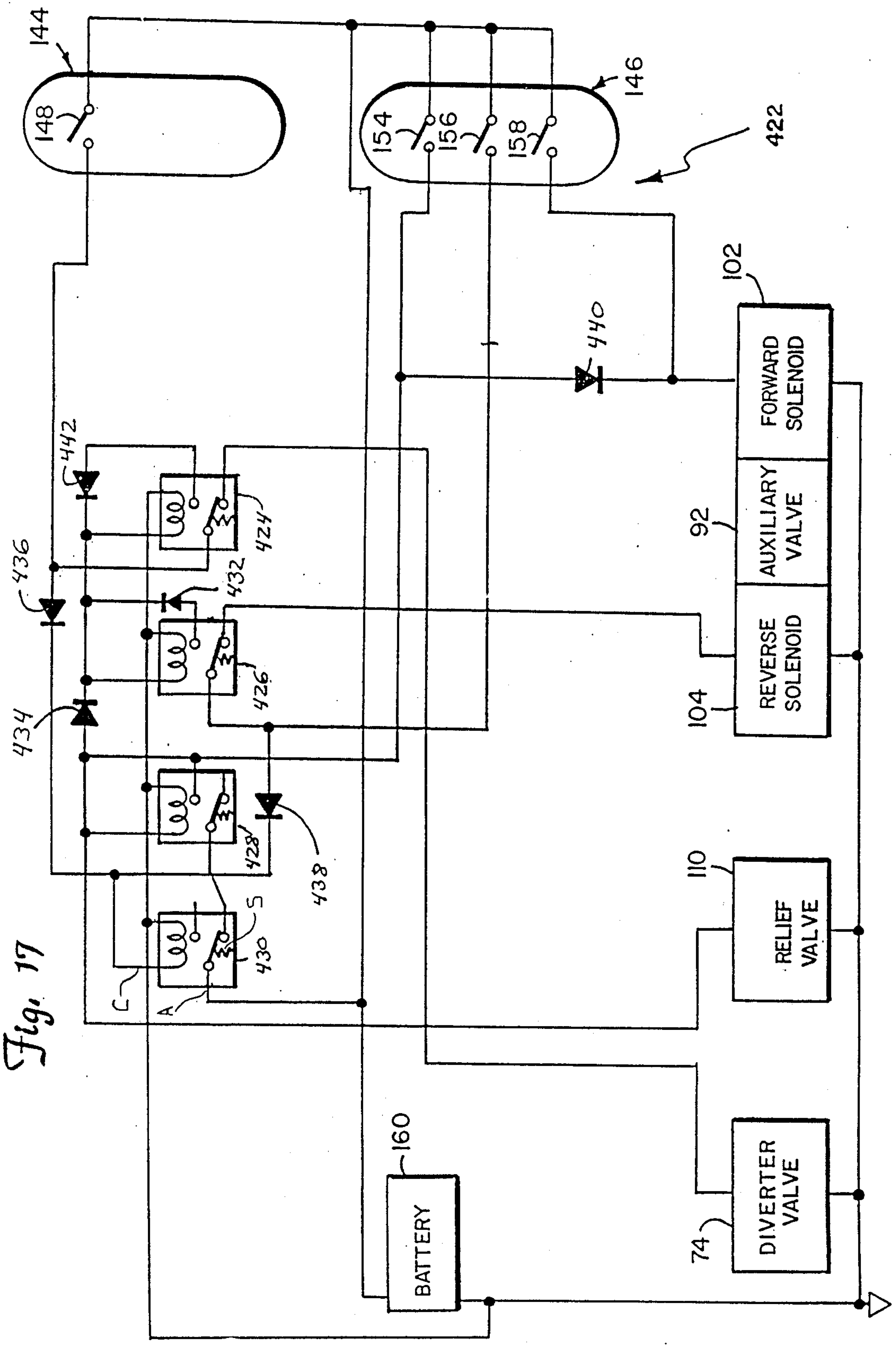
FIG. 17 is a schematic and block diagram representation of the electric control system shown in FIG. 16.

Another embodiment of the present invention, hydraulic system 420 and its associated electric control system 422, is illustrated in FIGS. 16 and 17, respectively. Hydraulic system 420 includes all the options described above with reference to hydraulic system 60, but has the high pressure option selected in a different manner. Elements shown in FIGS. 16 and 17 which function in a manner similar to their counterparts in FIGS. 3 and 4 are denoted by identical reference numerals.

As shown in FIG. 17, electric control system 422 includes switch assemblies 144 and 146, solenoids 102 and 104, diverter valve 74, battery 160, relief valve 110, relays 424, 426, 428 and 430, and diodes 432, 434, 436, 438 and 440. Electric control system 422 is configured in such a manner that actuation of switches 148, 154, 156 and 158 will cause diverter valve 74 and solenoids 102 and 104 to operate in a manner described above with reference to electric control system 142. Separate control of the high pressure option is not, however, permitted. Electric control system 422 is configured to cause the high pressure option to be selected or implemented (i.e. relief valve 110 actuated) whenever auxiliary latch switch 154 is actuated. Operation of hydraulic system 420 in the high pressure mode will then be discontinued whenever auxiliary reverse switch 156 is actuated or diverter switch 148 is actuated.

Although the present invention has been described with reference to preferred embodiments, those skilled in the art will recognize that changes may be made in form and detail without departing from the spirit and scope of the invention.

What is claimed is:

1. A skid steer loader adapted for use in conjunction with an attachment having a hydraulic motor, including:

an operator compartment;

an engine;

ground engaging drive wheels;

a lift arm assembly;

hydraulic pump means driven by the engine for providing hydraulic fluid under pressure;

an attachment mount for removably mounting an attachment having an auxiliary hydraulic motor to the lift arm assembly of the loader;

auxiliary fluid fitting means for coupling hydraulic fluid to a hydraulic motor of an attachment;

a drive control lever having a hand grip and mounted within the operator compartment;

an electrically actuated auxiliary control valve coupling the auxiliary fluid fitting means to the hydraulic pump means, for controlling flow of hydraulic fluid to the auxiliary fluid fitting means in response to electric control signals; and an operator actuated auxiliary forward latch switch system at least partially mounted to the hand grip of the control lever and coupled to the auxiliary control valve, for controlling electric auxiliary control signals to initiate continuous fluid flow in a first direction to the auxiliary fluid fitting means in response to a first operator actuation, and to discontinue the continuous fluid flow in response to a second operator actuation.

2. The skid steer loader of claim 1 wherein the operator actuated auxiliary forward latch switch system includes:

a forward latch switch mounted to the control lever hand grip; and circuitry coupling the forward latch switch to the auxiliary control valve, for causing continuous fluid flow in a forward direction when the forward latch switch is actuated.

3. The skid steer loader of claim 2 wherein:

the forward latch switch system further includes a forward momentary switch and a reverse momentary switch, both mounted to the control lever hand grip; and the circuitry couples the forward and reverse momentary switches to the auxiliary control valve and causes hydraulic fluid flow in a forward direction during actuation of the forward momentary switch by the operator, and causes the hydraulic fluid to flow in a reverse direction during actuation of the reverse momentary switch by the operator.

4. The skid steer loader of claim 3 wherein the circuitry causes the continuous fluid flow in the forward direction to be discontinued when the reverse momentary switch is actuated.

5. The skid steer loader of claim 2 wherein the circuitry means includes electromechanical relays.

6. The skid steer loader of claim 1 wherein the auxiliary fluid fitting means includes hydraulic hoses.

7. A skid steer loader adapted for use in conjunction with an attachment having a hydraulic motor, including:

an operator compartment;

an engine;

ground engaging drive wheels;

hydraulic pump means driven by the engine for providing hydraulic fluid under pressure;

an attachment mount for mounting an attachment having a hydraulic motor to the loader;

auxiliary fluid fitting means for coupling hydraulic fluid to a hydraulic motor of an attachment;

a hydraulic control valve coupling the auxiliary fluid fitting means to the hydraulic pump means in a hydraulic circuit, for controlling hydraulic fluid flow to the auxiliary fluid fitting means;

an electrically actuated pressure relief assembly coupled in the hydraulic circuit and responsive to electric pressure control signals for causing the pressure of the hydraulic fluid to have one of a plurality of maximum pressures; and a pressure control switch mounted within the operator compartment and coupled to the pressure relief assembly, for controlling the electric pressure control signals in response to operator actuation, thereby permitting the operator to select the maximum pressure of the hydraulic fluid in the hydraulic circuit.

8. The skid steer loader of claim 7, wherein the electrically actuated pressure relief assembly includes:

a first relatively low pressure relief valve;

an electrically actuated flow control valve connected in series with the low pressure relief valve, and coupled to receive the pressure control signals controlled by the pressure control switch; and a second relatively high pressure relief valve coupled in a parallel hydraulic circuit with the series combination of the low pressure relief valve and the flow control valve, circuit is established by the first relatively low pressure relief valve when the flow control valve is actuated in a manner permitting fluid flow, and the maximum pressure in the hydraulic circuit is determined by the second relatively high pressure relief valve when the flow control valve is actuated in a manner prohibiting fluid flow.

9. The skid steer loader of claim 7 and further including:

a drive control lever having a hand grip and mounted in the operator compartment; and means for mounting the pressure control switch to the hand grip.

10. The skid steer loader of claim 7 and further including an attachment having a hydraulic motor coupled to the auxiliary fluid fitting means.

11. The skid steer loader of claim 7 and further including:

circuitry coupling the pressure control switch to the electrically actuated pressure relief assembly.

12. A skid steer loader adapted for use in conjunction with front and/or rear mounted attachments having hydraulic motors, including:

an operator compartment;

an engine;

ground engaging drive wheels;

hydraulic pump means driven by the engine for providing hydraulic fluid under pressure;

a lift arm assembly pivotally mounted to the loader;

a front attachment mount for removably mounting a front mounted attachment having a hydraulic motor to the lift arm assembly;

front auxiliary fluid fitting means for coupling hydraulic fluid to a hydraulic motor of a front mounted attachment;

a rear attachment mount for removably mounting a rear mounted attachment having a hydraulic motor to a rear portion of the loader;

rear auxiliary fluid fitting means for coupling hydraulic fluid to a hydraulic motor of a rear mounted attachment;

an auxiliary control valve fluidly coupled between the hydraulic pump means and the front and rear auxiliary fluid fitting means;

an electrically controlled diverter valve fluidly coupled between the auxiliary control valve and the front auxiliary fluid fitting means, and between the auxiliary control valve and the rear auxiliary fluid fitting means, for selectively routing hydraulic fluid between the auxiliary control valve and one of the front and rear auxiliary fluid fitting means in response to electric auxiliary select control signals; and a diverter switch mounted within the operator compartment and coupled to the diverter valve for controlling the auxiliary select signals in response to operator actuation.

13. The skid steer loader of claim 12 wherein the front and rear fitting means include hydraulic hoses.

14. The skid steer loader of claim 12 and further including:

circuit means coupling the diverter switch to the electrically controlled diverter valve.

15. The skid steer loader of claim 14 and further including:

a drive control lever having a hand grip mounted in the operator compartment; and mounting means for mounting the diverter switch to the hand grip.

16. A skid steer loader adapted for use in conjunction with front and/or rear mounted attachments having hydraulic motors, including:

an operator compartment;

an engine;

ground-engaging drive wheels;

hydraulic pump means driven by the engine for providing hydraulic fluid under pressure;

a lift arm assembly pivotally mounted to the loader;

a front attachment mount for removably mounting a front mounted attachment to the lift arm assembly;

front auxiliary fluid fitting means for coupling hydraulic fluid to a hydraulic motor of a front mounted attachment;

a rear attachment mount for removably mounting a rear mounted attachment to the rear of the loader;

rear auxiliary fluid fitting means for coupling hydraulic fluid to a hydraulic motor of a rear mounted attachment;

an electrically actuated auxiliary control valve coupled in a hydraulic circuit between the hydraulic pump means and the front and rear auxiliary fluid fitting means, for controlling hydraulic fluid flow in response to electric auxiliary control signals;

an electrically controlled diverter valve coupled in the hydraulic circuit between the auxiliary control valve and the front auxiliary fluid fitting means, and between the auxiliary control valve and the rear auxiliary fluid fitting means, for selectively routing hydraulic fluid between the auxiliary control valve and one of the front and rear auxiliary fluid fitting means in response to electric auxiliary select signals;

an electrically actuated pressure relief assembly coupled in the hydraulic circuit and responsive to electric system pressure control signals for causing pressure of the hydraulic fluid in the hydraulic circuit to have one of a plurality of maximum pressures;

a diverter switch mounted within the operator compartment and coupled to the diverter valve for controlling the auxiliary select signals in response to operator actuation;

an auxiliary control switch mechanism mounted within the operator compartment and coupled to the auxiliary control valve, for permitting operator control of the electrically actuated auxiliary control valve by controlling the electric auxiliary control signals in response to operator actuation; and a pressure control switch mounted within the operator compartment and coupled to the pressure relief assembly for controlling the electric system pressure control signals in response to operator actuation, thereby permitting the operator to select the maximum pressure of the hydraulic fluid in the hydraulic circuit.

17. The skid steer loader of claim 16 and further including:

drive control levers having hand grips mounted within the operator compartment; and means for mounting the diverter switch, auxiliary control switch mechanism and pressure control switch to the hand grips.

18. The skid steer loader of claim 16 wherein the auxiliary control switch mechanism includes:

a forward momentary switch;

a reverse momentary switch; and circuitry coupling the forward and reverse momentary switches to the auxiliary control valve for causing hydraulic fluid flow in a forward direction during actuation of the forward momentary switch by the operator, and for causing hydraulic fluid flow in a reverse direction during actuation of the reverse switch by the operator.

19. The skid steer loader of claim 18 wherein:

the operator actuated auxiliary control switch mechanism further includes a forward latch switch; and the circuitry couples the forward latch switch to the auxiliary control valve and initiates continuous fluid flow in the forward direction when the forward latch switch is actuated.

20. The skid steer loader of claim 19 wherein the circuitry further includes means for discontinuing continuous fluid flow in the forward direction when the momentary switch is actuated.

21. A skid steer loader adapted for use in conjunction with an attachment having a hydraulic motor, including:

an operator compartment;

an engine;

ground-engaging drive wheels;

hydraulic pump means driven by the engine for providing hydraulic fluid under pressure;

an attachment mount for removably mounting an attachment having an auxiliary hydraulic motor to the loader;

auxiliary fluid fitting means for coupling hydraulic fluid to a hydraulic motor of an attachment;

an electrically actuated auxiliary control valve coupled in a hydraulic circuit between the hydraulic pump means and the auxiliary fluid fitting means, for controlling hydraulic fluid flow in response to electric auxiliary control signals;

an electrically actuated pressure relief assembly coupled in the hydraulic circuit for selectively relieving pressure in the hydraulic circuit at a first relatively low relief pressure or a second relatively high relief pressure in response to electric system pressure control signals;

an auxiliary latch switch assembly mounted within the operator compartment and coupled to the auxiliary control valve and to the pressure relief assembly, for controlling auxiliary control signals causing continuous fluid flow in a first direction to the auxiliary fluid fitting means, and for controlling pressure control signals actuating the pressure relief assembly to select the second relatively high relief pressure in the hydraulic circuit, when actuated by an operator.

22. The skid steer loader of claim 21 and further including an unlatch switch assembly coupled to the pressure relief assembly and the auxiliary control valve, for actuating the control valve and discontinuing continuous forward fluid flow, and for actuating the relief assembly to select the first relatively low relief pressure in the hydraulic circuit, when actuated by an operator.

23. The skid steer loader of claim 22 and further including:

a drive control lever; and means for mounting the latch switch assembly and unlatch switch assembly to the control lever.

24. The skid steer loader of claim 21 wherein the latch switch assembly includes:

a forward latch switch; and circuitry coupling the forward latch switch to the auxiliary control valve and to the pressure relief assembly, for providing the auxiliary control signals causing continuous hydraulic fluid flow in a forward direction, and for providing the pressure relief signals actuating the pressure relief assembly to select the second relatively high relief pressure in the hydraulic circuit, in response to operator actuation of the forward latch switch.

25. The skid steer loader of claim 24 wherein:

the latch switch assembly further includes:

a forward momentary switch;

a reverse momentary switch; and the circuitry couples the forward and reverse momentary switches to the auxiliary valve and pressure relief assembly, and provides auxiliary control signals causing hydraulic fluid flow in the forward direction when the forward switch is actuated by the operator, provides auxiliary control signals causing hydraulic fluid flow in a reverse direction when the reverse switch is actuated, and provides auxiliary control signals discontinuing continuous forward fluid flow and pressure relief signals actuating the pressure relief assembly to select the first relatively low relief pressure in the hydraulic circuit, when the reverse switch is actuated.

26. The skid steer loader of claim 25 wherein the circuit means includes electromechanical relays.

* * * * *

UNITED STATES PATENT AND TRADEMARK OFFICE
CERTIFICATE OF CORRECTION

PATENT NO. : 4,949,805

DATED : August 21, 1990

INVENTOR(S) : Joseph M. Mather et al.

It is certified that error appears in the above-identified patent and that said Letters Patent is hereby corrected as shown below:

Col. 13, line 31, delete "means".

Col. 18, line 4, after "auxiliary", insert --control--.

Signed and Sealed this

Twenty-fourth Day of December, 1991

*Attest:*

HARRY F. MANBECK, JR.

*Attesting Officer* *Commissioner of Patents and Trademarks*